United States Patent
Barbieri et al.

(10) Patent No.: US 9,226,288 B2
(45) Date of Patent: Dec. 29, 2015

(54) METHOD AND APPARATUS FOR SUPPORTING COMMUNICATIONS IN A HETEROGENEOUS NETWORK

(75) Inventors: Alan Barbieri, San Diego, CA (US); Tingfang Ji, San Diego, CA (US); Tao Luo, San Diego, CA (US); Madhavan Srinivasan Vajapeyam, San Diego, CA (US); Osok Song, San Diego, CA (US); Aleksandar Damnjanovic, Del Mar, CA (US); Yongbin Wei, San Diego, CA (US); Parag Arun Agashe, San Diego, CA (US); Durga Prasad Malladi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 177 days.

(21) Appl. No.: 13/085,080

(22) Filed: Apr. 12, 2011

(65) Prior Publication Data

US 2012/0093095 A1   Apr. 19, 2012

Related U.S. Application Data

(60) Provisional application No. 61/323,853, filed on Apr. 13, 2010.

(51) Int. Cl.
*H04W 4/00* (2009.01)
*H04W 72/04* (2009.01)
*H04W 72/00* (2009.01)
*H04W 72/12* (2009.01)

(52) U.S. Cl.
CPC ........ *H04W 72/0426* (2013.01); *H04W 72/005* (2013.01); *H04W 72/1231* (2013.01); *H04W 72/1289* (2013.01)

(58) Field of Classification Search
None
See application file for complete search history.

(56) References Cited

U.S. PATENT DOCUMENTS

| 4,857,863 A | 8/1989 | Ganger et al. |
| 5,051,625 A | 9/1991 | Ikeda et al. |

(Continued)

FOREIGN PATENT DOCUMENTS

| CN | 1311968 A | 9/2001 |
| CN | 101018220 A | 8/2007 |

(Continued)

OTHER PUBLICATIONS

3GPP: "3rd Generation Partnership Project; Technical Specification Group Radio Access Network; Evolved Universal Terrestria Radio Access (E-UTRA); Physical 1 ayer procedures (Re1 ease 8)" 3GPP TS 36.213 V8.7.0 (May 2009) Technical Specification, No. V8.7.0, Jun. 8, 2009, pp. 1-77, XP002602609.

(Continued)

*Primary Examiner* — Otis L Thompson, Jr.
(74) *Attorney, Agent, or Firm* — Dalei Dong

(57) ABSTRACT

A method, an apparatus, and a computer program product for wireless communication are provided in which an apparatus may determine broadcast channel scheduling information for one or more broadcasts of a payload by a broadcast channel associated with a first base station based on one or more broadcast channel interference coordination schemes, wherein reception of the broadcast channel associated with the first base station is interfered at least in part based on one or more transmissions from a second base station, and receive the payload based on the determined broadcast channel scheduling information.

92 Claims, 21 Drawing Sheets

(56) References Cited

U.S. PATENT DOCUMENTS

| | | |
|---|---|---|
| 5,587,678 A | 12/1996 | Dijkmans |
| 5,745,012 A | 4/1998 | Oka et al. |
| 5,748,019 A | 5/1998 | Wong et al. |
| 5,786,734 A | 7/1998 | Park |
| 5,949,259 A | 9/1999 | Garcia |
| 5,973,512 A | 10/1999 | Baker |
| 5,982,246 A | 11/1999 | Hofhine et al. |
| 6,040,744 A | 3/2000 | Sakurai et al. |
| 6,147,550 A | 11/2000 | Holloway |
| 6,151,492 A | 11/2000 | Melin |
| 6,167,240 A | 12/2000 | Carlsson et al. |
| 6,222,851 B1 | 4/2001 | Petry |
| 6,359,869 B1 | 3/2002 | Sonetaka |
| 6,504,830 B1 | 1/2003 | Ostberg et al. |
| 6,556,094 B2 | 4/2003 | Hasegawa et al. |
| 6,653,878 B2 | 11/2003 | Nolan |
| 6,677,799 B1 | 1/2004 | Brewer |
| 6,724,813 B1 | 4/2004 | Jamal et al. |
| 6,734,747 B1 | 5/2004 | Ishikawa et al. |
| 6,819,168 B1 | 11/2004 | Brewer |
| 6,819,195 B1 | 11/2004 | Blanchard et al. |
| 7,019,551 B1 | 3/2006 | Biesterfeldt |
| 7,129,798 B2 | 10/2006 | Aoyama et al. |
| 7,142,059 B2 | 11/2006 | Klein et al. |
| 7,420,395 B2 | 9/2008 | Kuramasu |
| 7,630,339 B2 | 12/2009 | Laroia et al. |
| 7,652,533 B2 | 1/2010 | Wang et al. |
| 7,710,212 B2 | 5/2010 | Seliverstov |
| 7,742,444 B2 | 6/2010 | Mese et al. |
| 7,786,779 B2 | 8/2010 | Chang et al. |
| 7,795,902 B1 | 9/2010 | Yella |
| 7,817,666 B2 | 10/2010 | Spinar et al. |
| 7,843,886 B2* | 11/2010 | Johnson et al. ............... 370/332 |
| 7,859,314 B2 | 12/2010 | Rutkowski et al. |
| 7,924,066 B2 | 4/2011 | Gagne et al. |
| 7,940,740 B2 | 5/2011 | Krishnamurthy et al. |
| 8,010,151 B2 | 8/2011 | Kim et al. |
| 8,058,928 B2 | 11/2011 | Terzioglu |
| 8,077,670 B2 | 12/2011 | Fan et al. |
| 8,085,875 B2 | 12/2011 | Gore et al. |
| 8,155,069 B2 | 4/2012 | Chun et al. |
| 8,174,995 B2 | 5/2012 | Malladi |
| 8,228,827 B2 | 7/2012 | Jeong et al. |
| 8,363,697 B2 | 1/2013 | Grob et al. |
| 8,446,869 B2 | 5/2013 | Lee et al. |
| 2003/0043928 A1 | 3/2003 | Ling et al. |
| 2005/0064873 A1 | 3/2005 | Karaoguz et al. |
| 2005/0096061 A1 | 5/2005 | Ji et al. |
| 2005/0254555 A1 | 11/2005 | Teague et al. |
| 2005/0260990 A1 | 11/2005 | Huang et al. |
| 2006/0098604 A1 | 5/2006 | Flammer |
| 2006/0166693 A1 | 7/2006 | Jeong et al. |
| 2007/0064669 A1 | 3/2007 | Classon et al. |
| 2007/0087691 A1 | 4/2007 | Lee et al. |
| 2007/0104166 A1 | 5/2007 | Rahman et al. |
| 2007/0153719 A1* | 7/2007 | Gopal ............................ 370/328 |
| 2007/0167181 A1 | 7/2007 | Ramesh et al. |
| 2007/0242763 A1 | 10/2007 | Li et al. |
| 2007/0253355 A1* | 11/2007 | Hande et al. .................. 370/328 |
| 2008/0008212 A1 | 1/2008 | Wang et al. |
| 2008/0013500 A1 | 1/2008 | Laroia et al. |
| 2008/0056193 A1 | 3/2008 | Bourlas et al. |
| 2008/0075032 A1 | 3/2008 | Balachandran et al. |
| 2008/0106297 A1 | 5/2008 | Jao |
| 2008/0130588 A1 | 6/2008 | Jeong et al. |
| 2008/0205322 A1* | 8/2008 | Cai et al. ....................... 370/312 |
| 2008/0212514 A1 | 9/2008 | Chen |
| 2008/0219236 A1 | 9/2008 | Love et al. |
| 2008/0220791 A1 | 9/2008 | Cho et al. |
| 2008/0227449 A1* | 9/2008 | Gholmieh et al. ............. 455/434 |
| 2008/0253300 A1* | 10/2008 | Wakabayashi et al. ....... 370/252 |
| 2008/0254804 A1 | 10/2008 | Lohr et al. |
| 2008/0260000 A1 | 10/2008 | Periyalwar et al. |
| 2008/0260062 A1 | 10/2008 | Imamura |
| 2008/0268859 A1 | 10/2008 | Lee et al. |
| 2008/0285513 A1 | 11/2008 | Jung et al. |
| 2009/0046605 A1 | 2/2009 | Gao et al. |
| 2009/0046674 A1 | 2/2009 | Gao et al. |
| 2009/0069023 A1 | 3/2009 | Ahn et al. |
| 2009/0088175 A1 | 4/2009 | Pelletier et al. |
| 2009/0103500 A1 | 4/2009 | Malkamaki et al. |
| 2009/0109915 A1 | 4/2009 | Pasad et al. |
| 2009/0131065 A1 | 5/2009 | Khandekar et al. |
| 2009/0135769 A1 | 5/2009 | Sambhwani et al. |
| 2009/0154458 A1 | 6/2009 | Kim et al. |
| 2009/0175214 A1 | 7/2009 | Sfar et al. |
| 2009/0196165 A1 | 8/2009 | Morimoto et al. |
| 2009/0196249 A1 | 8/2009 | Kawamura et al. |
| 2009/0196250 A1 | 8/2009 | Feng et al. |
| 2009/0197631 A1 | 8/2009 | Palanki et al. |
| 2009/0201880 A1 | 8/2009 | Aghili et al. |
| 2009/0213769 A1 | 8/2009 | Shen et al. |
| 2009/0238117 A1 | 9/2009 | Somasundaram et al. |
| 2009/0239590 A1 | 9/2009 | Parkvall |
| 2009/0252077 A1 | 10/2009 | Khandekar et al. |
| 2009/0257371 A1 | 10/2009 | Nishio |
| 2009/0257390 A1 | 10/2009 | Ji et al. |
| 2009/0264077 A1 | 10/2009 | Damnjanovic |
| 2009/0268684 A1 | 10/2009 | Lott et al. |
| 2009/0274086 A1 | 11/2009 | Petrovic et al. |
| 2009/0298498 A1 | 12/2009 | Pisut et al. |
| 2009/0312024 A1 | 12/2009 | Chen et al. |
| 2009/0325626 A1 | 12/2009 | Palanki et al. |
| 2010/0008282 A1 | 1/2010 | Bhattad et al. |
| 2010/0022250 A1 | 1/2010 | Petrovic et al. |
| 2010/0029282 A1 | 2/2010 | Stamoulis et al. |
| 2010/0034135 A1 | 2/2010 | Kim et al. |
| 2010/0034158 A1 | 2/2010 | Meylan |
| 2010/0035600 A1 | 2/2010 | Hou et al. |
| 2010/0067472 A1 | 3/2010 | Ball et al. |
| 2010/0069076 A1* | 3/2010 | Ishii et al. ...................... 455/450 |
| 2010/0080154 A1 | 4/2010 | Noh et al. |
| 2010/0091919 A1 | 4/2010 | Xu et al. |
| 2010/0110964 A1* | 5/2010 | Love et al. ..................... 370/312 |
| 2010/0128690 A1 | 5/2010 | McBeath et al. |
| 2010/0144317 A1 | 6/2010 | Jung et al. |
| 2010/0232373 A1 | 9/2010 | Nory et al. |
| 2010/0240386 A1 | 9/2010 | Hamabe et al. |
| 2010/0246521 A1 | 9/2010 | Zhang et al. |
| 2010/0254268 A1 | 10/2010 | Kim et al. |
| 2010/0254329 A1 | 10/2010 | Pan et al. |
| 2010/0254344 A1* | 10/2010 | Wei et al. ...................... 370/330 |
| 2010/0260156 A1 | 10/2010 | Lee et al. |
| 2010/0265870 A1 | 10/2010 | Cai et al. |
| 2010/0272059 A1 | 10/2010 | Bienas et al. |
| 2010/0290372 A1 | 11/2010 | Zhong et al. |
| 2010/0304665 A1 | 12/2010 | Higuchi |
| 2010/0309803 A1 | 12/2010 | Toh et al. |
| 2010/0309867 A1 | 12/2010 | Palanki et al. |
| 2010/0309876 A1 | 12/2010 | Khandekar et al. |
| 2010/0322180 A1 | 12/2010 | Kim et al. |
| 2010/0323611 A1* | 12/2010 | Choudhury ........................ 455/7 |
| 2010/0331030 A1* | 12/2010 | Nory et al. .................... 455/509 |
| 2011/0007673 A1 | 1/2011 | Ahn et al. |
| 2011/0013554 A1 | 1/2011 | Koskinen |
| 2011/0032890 A1 | 2/2011 | Wu |
| 2011/0038271 A1* | 2/2011 | Shin et al. ...................... 370/252 |
| 2011/0044227 A1 | 2/2011 | Harrang et al. |
| 2011/0044261 A1 | 2/2011 | Cai et al. |
| 2011/0051684 A1 | 3/2011 | Li et al. |
| 2011/0053603 A1 | 3/2011 | Luo et al. |
| 2011/0064037 A1 | 3/2011 | Wei et al. |
| 2011/0081865 A1 | 4/2011 | Xiao et al. |
| 2011/0116364 A1 | 5/2011 | Zhang et al. |
| 2011/0116437 A1 | 5/2011 | Chen et al. |
| 2011/0134875 A1 | 6/2011 | Ding et al. |
| 2011/0149771 A1 | 6/2011 | Abeta et al. |
| 2011/0149813 A1 | 6/2011 | Parkvall et al. |
| 2011/0170503 A1 | 7/2011 | Chun et al. |
| 2011/0182245 A1 | 7/2011 | Malkamaki et al. |
| 2011/0188481 A1 | 8/2011 | Damnjanovic et al. |
| 2011/0190024 A1 | 8/2011 | Seong et al. |
| 2011/0194514 A1 | 8/2011 | Lee et al. |
| 2011/0199986 A1 | 8/2011 | Fong et al. |

(56) References Cited

U.S. PATENT DOCUMENTS

| | | | |
|---|---|---|---|
| 2011/0201279 A1 | 8/2011 | Suzuki et al. | |
| 2011/0205982 A1 | 8/2011 | Yoo et al. | |
| 2011/0211503 A1* | 9/2011 | Che et al. | 370/280 |
| 2011/0243075 A1 | 10/2011 | Luo et al. | |
| 2011/0249643 A1 | 10/2011 | Barbieri et al. | |
| 2011/0268032 A1 | 11/2011 | Kim et al. | |
| 2011/0274066 A1 | 11/2011 | Tee et al. | |
| 2011/0275394 A1 | 11/2011 | Song et al. | |
| 2011/0310789 A1 | 12/2011 | Hu et al. | |
| 2011/0310830 A1 | 12/2011 | Wu et al. | |
| 2011/0317624 A1 | 12/2011 | Luo et al. | |
| 2012/0026892 A1 | 2/2012 | Nakao et al. | |
| 2012/0033588 A1 | 2/2012 | Chung et al. | |
| 2012/0033627 A1 | 2/2012 | Li et al. | |
| 2012/0033647 A1 | 2/2012 | Moon et al. | |
| 2012/0039180 A1 | 2/2012 | Kim et al. | |
| 2012/0039208 A1* | 2/2012 | Aydin | 370/252 |
| 2012/0087250 A1 | 4/2012 | Song et al. | |
| 2012/0088516 A1 | 4/2012 | Ji et al. | |
| 2012/0093097 A1 | 4/2012 | Che et al. | |
| 2012/0106481 A1 | 5/2012 | Cho et al. | |
| 2012/0108239 A1 | 5/2012 | Damnjanovic et al. | |
| 2012/0108255 A1* | 5/2012 | Jo et al. | 455/450 |
| 2012/0155366 A1* | 6/2012 | Zirwas et al. | 370/312 |
| 2012/0182958 A1 | 7/2012 | Pelletier et al. | |
| 2012/0212260 A1 | 8/2012 | Chen et al. | |
| 2012/0236798 A1 | 9/2012 | Raaf et al. | |
| 2012/0281656 A1 | 11/2012 | Hooli et al. | |
| 2013/0005344 A1* | 1/2013 | Dimou et al. | 455/441 |
| 2013/0077543 A1 | 3/2013 | Kim et al. | |
| 2013/0077576 A1 | 3/2013 | Abe et al. | |
| 2013/0229933 A1 | 9/2013 | Ji et al. | |
| 2013/0250927 A1 | 9/2013 | Song | |
| 2014/0036838 A1 | 2/2014 | Yoo et al. | |
| 2014/0146798 A1 | 5/2014 | Damnjanovic et al. | |

FOREIGN PATENT DOCUMENTS

| | | |
|---|---|---|
| CN | 101090281 A | 12/2007 |
| CN | 101155399 A | 4/2008 |
| CN | 101262680 A | 9/2008 |
| CN | 101316267 A | 12/2008 |
| CN | 101400130 A | 4/2009 |
| CN | 101483511 A | 7/2009 |
| CN | 101499882 A | 8/2009 |
| CN | 101505498 A | 8/2009 |
| CN | 101686580 A | 3/2010 |
| EP | 1811711 A1 | 7/2007 |
| EP | 2076066 | 7/2009 |
| JP | H06350514 A | 12/1994 |
| JP | 09501038 A | 1/1997 |
| JP | 09327060 A | 12/1997 |
| JP | H1118144 A | 1/1999 |
| JP | 2001231077 A | 8/2001 |
| JP | 2003506960 A | 2/2003 |
| JP | 2005277570 A | 10/2005 |
| JP | 2006345405 A | 12/2006 |
| JP | 2007529915 A | 10/2007 |
| JP | 2008017325 A | 1/2008 |
| JP | 2008500764 A | 1/2008 |
| JP | 2008500766 A | 1/2008 |
| JP | 2008172357 A | 7/2008 |
| JP | 2008301493 A | 12/2008 |
| JP | 2009527939 A | 7/2009 |
| JP | 2010506446 A | 2/2010 |
| JP | 2010081446 A | 4/2010 |
| JP | 2010516163 A | 5/2010 |
| JP | 2010519784 A | 6/2010 |
| JP | 2010536256 A | 11/2010 |
| JP | 2010541492 A | 12/2010 |
| JP | 2011505088 A | 2/2011 |
| JP | 2011505091 A | 2/2011 |
| JP | 2011507391 A | 3/2011 |
| JP | 2011516000 A | 5/2011 |
| JP | 2013502841 A | 1/2013 |
| KR | 20100018453 A | 2/2010 |
| RU | 2305902 C2 | 9/2007 |
| RU | 2007105748 A | 8/2008 |
| RU | 2369965 C2 | 10/2009 |
| WO | 0111804 A1 | 2/2001 |
| WO | 2004066104 | 8/2004 |
| WO | 2004079949 A1 | 9/2004 |
| WO | WO-2005019705 A1 | 3/2005 |
| WO | WO-2005062798 A2 | 7/2005 |
| WO | 2005071867 | 8/2005 |
| WO | WO 2005109705 | 11/2005 |
| WO | 2005125053 A1 | 12/2005 |
| WO | WO-2006020021 A1 | 2/2006 |
| WO | 2006099546 A1 | 9/2006 |
| WO | WO-2007080892 A1 | 7/2007 |
| WO | 2007097672 A1 | 8/2007 |
| WO | WO 2007097671 A1 | 8/2007 |
| WO | WO 2007108630 A1 | 9/2007 |
| WO | 2007129537 A1 | 11/2007 |
| WO | 2007129620 A1 | 11/2007 |
| WO | WO-2008024751 A2 | 2/2008 |
| WO | 2008040448 A1 | 4/2008 |
| WO | 2008041819 A2 | 4/2008 |
| WO | 2008057969 | 5/2008 |
| WO | 2008081816 A1 | 7/2008 |
| WO | 2008086517 | 7/2008 |
| WO | 2008093985 A1 | 8/2008 |
| WO | WO-2008116128 A2 | 9/2008 |
| WO | 2009011059 A1 | 1/2009 |
| WO | 2009020926 A1 | 2/2009 |
| WO | WO 2009016260 A1 | 2/2009 |
| WO | WO 2009022295 | 2/2009 |
| WO | WO 2009038367 | 3/2009 |
| WO | 2009043002 | 4/2009 |
| WO | 2009046061 A2 | 4/2009 |
| WO | WO-2009048246 A2 | 4/2009 |
| WO | WO 2009062115 | 5/2009 |
| WO | WO 2009064147 A2 | 5/2009 |
| WO | 2009067842 A1 | 6/2009 |
| WO | 2009071583 A1 | 6/2009 |
| WO | 2009076803 A1 | 6/2009 |
| WO | WO 2009078795 A1 | 6/2009 |
| WO | 2009089798 A1 | 7/2009 |
| WO | WO 2009088251 A2 | 7/2009 |
| WO | 2009096846 A1 | 8/2009 |
| WO | WO-2009126586 A2 | 10/2009 |
| WO | 2009152866 A1 | 12/2009 |
| WO | WO-2010006285 A2 | 1/2010 |
| WO | 2010016607 A1 | 2/2010 |
| WO | WO 2010016726 A2 | 2/2010 |
| WO | 2010033957 A2 | 3/2010 |
| WO | WO-2010032791 A1 | 3/2010 |
| WO | 2010044903 A2 | 4/2010 |
| WO | WO-2010039738 | 4/2010 |
| WO | 2010110840 A2 | 9/2010 |

OTHER PUBLICATIONS

3GPP: "3rd Generation Partnership Project; Technical Specification Group Radio Access Network; Evolved Universal Terrestrial Radio Access (E-UTRA); Services provided by the physical layer (Release 8)", 3GPP Standard; 3GPP TS 36.302, 3rd Generation Partnership Project (3GPP), Mobile Competence Centre ; 650, Route Des Lucioles ; F-06921 Sophia-Antipolis Cedex ; France, No. V8.1.0, Mar. 1, 2009, pp. 1-17, XP050377589.

3GPP: "3rd Generation Partnership Project;Technical Specification Group Radio Access Network;Further Advancements for E-UTRAPhysical Layer Aspects(Release 9)", 3GPP Draft; TR 36.814_110, 3rd Generation Partnership Project (3GPP), Mobile Competence Centre ; 650, Route Des Lucioles ; F-06921 Sophiaantipolis Cedex ; France, no. San Francisco, USA; May 9, 2009, pp. 1-34, XP050339706, [retrieved on May 9, 2009].

3rd Generation Partnership Project: "3rd Generation Partnership Project; Technical Specification Group Radio Access Network; Evolved Universal Terrestrial Radio Access (E-UTRA) Medium Access Control (MAC) protocol specification (Release 8); 3GPP TS

(56) References Cited

OTHER PUBLICATIONS 36.321 V8.5.0" 3GPP TS 36.321 V8.5.0 [Online] vol. 36.321, No. V8.5.0, Mar. 1, 2009, pp. 1-46, XP002555765 Internet Retrieved from the Internet: URL:http://www.3gpp.orq/ftp/Specs/html-inf 0/36321.htm> [retrieved on Oct. 21, 2009] Sections 5.1.1 to 5.1.6.

"3rd Generation Partnership Project; Technical Specification Group Radio Access Network; Evolved Universal Terrestrial Radio Access (E-UTRA) and Evolved Uni versal Terrestrial Radio Access Network (E-UTRAN); Overall description ; Stage 2 (Release 8)" 3GPP Standard; 3GPP TS 36.300, 3rd Generation Partnership Project (3GPP), Mobile Competence Centre ; 650, Route Des Lucioles ; F-06921 Sophia-Antipolis Cedex ; France, No. V8.8.0, Mar. 1, 2009, pp. 1-157, XP050377583.

Ericsson: 3GPP Draft; R3-083577, 3rd Generation Partnership Project (3GPP), Mobile Competence Centre ; 650, Route Des Lucioles ; F-06921 Sophia-Antipolis Cedex ; France, no. Prague, Czech Republic; Nov. 25, 2008, XP050324756 [retrieved on Nov. 25, 2008] Section 10.1.5.1.

Ericsson: "Simultaneous reception of transport channels in the LTE", 3GPP Draft; 36302_CR0009_(REL-8) R2-093578, 3rd Generation Partnership Project (3GPP), Mobile Competence Centre ; 650, Route Des Lucioles ; F-06921 Sophia-Antipolis Cedex ; France, no. San Francisco, USA; May 9, 2009, pp. 1-3, XP050340488, [retrieved on May 9, 2009].

Huawei: "R-PDCCH Design" 3GPP Draft; R1-093042 R-PDCCH Design, 3rd Generation Partnership Project (3GPP), Mobile Competence Centre ; 650, Route Des Lucioles ; F-06921 Sophia-Antipolis Cedex ; France, no. Shenzhen, China; 20090818, Aug. 18, 2009, XP050351434 [retrieved on Aug. 18, 2009] p. 1, paragraph 1.

Kulkarni P., et al.,"Radio Resource Management Considerations for LTE Femto Cells", ACM SIGCOMM Computer Communication Review, vol. 40, No. 1, Jan. 2010, pp. 26-30.

LG Electronics Inc: "MAC Random Access Response Extension" 3GPP Draft; R2085237 MAC RAR Extension, 3rd Generation Partnership Project (3GPP), Mobile Competence Centre ; 650, Route Des Lucioles ; F-06921 Sophia-Antipolis Cedex ; France, no. Prague, Czech Republic; Sep. 23, 2008, XP050320136, [retrieved on Sep. 23, 2008] the whole document.

Potevio: "Considerations on the Resource Indication of R-PDCCH" 3GPP Draft; R1-093443 Considerations on the Resource Indication of R-PDCCH, 3rd Generation Partnership Project (3GPP), Mobile Competence Centre ; 650, Route Des Lucioles ; F-06921 Sophia-Antipolis Cedex ; France, no. Shenzhen, China; Aug. 18, 2009, XP050351718 [retrieved on Aug. 18, 2009] p. 1, paragraph 1-paragraph 2.

Samsung: "Clarification on the parallel receptions for PDSCHs", 3GPP Draft; 36302_CR0010 (REL-8) R2-093579, 3rd Generation Partnership Project (3GPP), Mobile Competence Centre ; 650, Route Des Lucioles ; F-06921 Sophia-Antipolis Cedex ; France, no. San Francisco, USA; May 19, 2009, pp. 1-2, XP050340489, [retrieved on May 19, 2009].

Samsung: "Downlink Subframe Alignment in Type I Relay" 3GPP Draft; R1-093386 Downlink Subframe Alignment in Type I Relay, 3rd Generation Partnership Project (3GPP), Mobile Competence Centre ; 650, Route Des Lucioles ; F-06921 Sophia-Antipolis Cedex ; France, no. Shenzhen, China; Aug. 19, 2009 , XP050351683 [retrieved on Aug. 19, 2009] p. 1, paragraph 1.

Samsung: "Inbound mobility to H(e)NBs" 3GPP Draft; R2-093250_INB0UND Mobility to H(E)NBS-R4, 3rd Generation Partnership Project (3GPP), Mobile Competence Centre ; 650, Route Des Lucioles ; F-06921 Sophia-Antipolis Cedex ; France, no. San Francisco, USA; Apr. 28, 2009, XP050340933 [retrieved on Apr. 28, 2009] the whole document.

Vice Chairman: "Report of E-UTRA control plane session" 3GPP Draft; R2-082841-Chair-Report-RAN2-62-LTE-CP, 3rd Generation Partnership Project (3GPP), Mobile Competence Centre ; 650, Route Des Lucioles ; F-06921 Sophia-Antipolis Cedex ; France, vol. RAN WG2, no. Kansas City, USA; May 14, 2008, XP050140403 [retrieved on May 14, 2008].

Young Jin Sang et al: "A Self-Organized Femtocell for IEEE 802.16e System", Global Telecommunications Conference, 2009. GLOBECOM 2009. IEEE, IEEE, Piscataway, NJ, USA, Nov. 30, 2009, pp. 1-5, XP031646102, ISBN: 978-1-4244-4148-8.

Qualcomm Incorporated, "RRM/RLM Resource Restriction for Time Domain ICIC", 3GPP TSG-RAN WG2 Meeting #72-bis, R2-110698, Dublin, Ireland, Jan. 17-21, 2011.

Qualcomm Incorporated, "Introduction of Time Domain ICIC", 3GPP TSG-RAN WG2 Meeting #72, R2-106943, Jacksonville, US, Nov. 15-19, 2010.

Taiwan Search Report—TW099146404—TIPO—Jul. 11, 2013.

3GPP TS 36.331 V8.5.0, Radio Resource Control (RRC); Protocol specification (Release 8), 204 pages, 2009.

Alcatel-Lucent Shanghai Bell et al., "Multi-cell cooperative RS in CoMP", 3GPP Draft; R1-092317, 3rd Generation Partnership Project (3GPP), Mobile Competence Centre; 650, Route Des Lucioles; F-06921 Sophia-Antipolis Cedex; France, no. Los Angeles, USA; Jun. 24, 2009, XP050350848, [retrieved on Jun. 24, 2009].

Ericsson: "Structure of System Information", TSGR2#4(99)414, 5 pages, May 1999.

Fujitsu, "An Efficient Reference Signal Design in LTE Advanced", 3GPP Draft; R1-090949, 3rd Generation Partnership Project (3GPP), Mobile Competence Centre, 650, Route Des Lucioles, F-06921 Sophia-Antipolis Cedex, France, no. Athens, Greece, Feb. 6, 2009, XP050318788.

Gale et al., "Distributed discreate resource optimization in Heterogeneous networks". 2008, pp. 560-564, IEEE 04641670.

Garcia F., et al.,"Design of a slew rate controlled output buffer", ASIC Conference 1998. Proceedings. Eleventh Annual IEEE International Rochester, NY, USA Sep. 13-16, 1998, New York, NY, USA.IEEE, US, Sep. 13, 1998, pp. 147-150, XP010309693, DOI: 10.1109/ASIC.1998.722821 ISBN: 978-0-7803-4980-3.

Huawei : "Enhanced ICIC for control channels to support Het.Net,", 3GPP TSG RAN WG1 meeting #61 R1-103126, May 14, 2010, pp. 1-8, XP002660456, Montreal , Canada Retrieved from the Internet : URL:http://ftp.3gpp.org/ftp/tsg-ran/WGI-RL1/TSGR1_61/Docs/ [retrieved on Sep. 30, 2011].

Huawei: "CQI Enhancement for Interference Varying Environments", 3GPP Draft; R1-101061 CQI Enhancement for Interference Varying Environments VER (Final), 3rd Generation Partnership Project (3GPP), Mobile Competence Centre ; 650, Route Des Lucioles ; F-06921 Sophia-Antipolis Cedex ; France, vol. RAN WGI, no. San Francisco, USA; Feb. 16, 2010, XP050418632, [retrieved on Feb. 16, 2010].

Huawei: "Discussion on OTDOA based positioning issue", 3GPP Draft; R1-092355, 3rd Generation Partnership Project (3GPP), Mobile Competence Centre; 650, Route Des Lucioles; F-06921 Sophia-Antipolis Cedex; France, no. Los Angeles, USA, Jun. 24, 2009, XP050350879, [retrieved on Jun. 24, 2009].

Huawei: "Enhanced ICIC and Resource-Specific CQI Measurement", 3GPP Draft; R1-101981, 3rd Generation Partnership Project (3GPP), Mobile Competence Centre ; 650, Route Des Lucioles ; F-06921 Sophia-Antipolis Cedex ; France, vol. RAN WGI, no. Beijing, china; Apr. 12, 2010, Apr. 6, 2010, XP050419318, [retrieved on Apr. 6, 2010].

Inoue et al., "Space time transmit site diversity for OFDM multi base station system", 2002, pp. 30-34, IEEE 01045691.

International Search Report and Written Opinion—PCT/US2011/032373, ISA/EPO—Jul. 19, 2011.

Panasonic: "PDCCH with cross component carrier assignment", 3GPP Draft; R1-093597(Update of R1-093464), 3rd Generation Partnership Project (3GPP), Mobile Competence Centre ; 650, Route Des Lucioles ; F-06921 Sophia-Antipolis Cedex ; France, no. Shenzhen, China; Aug. 24, 2009, XP050388168, [retrieved on Aug. 22, 2009].

Qualcomm Europe: "Carrier Aggregation in Heterogeneous Networks", 3GPP Draft; R1-092239, 3rd Generation Partnership Project (3GPP), Mobile Competence Centre; 650, Route Des Lucioles; F-06921 Sophia-Antipolis Cedex; France, no. San Francisco, USA; May 8, 2009, XP050339658, [retrieved on May 8, 2009].

(56) References Cited

OTHER PUBLICATIONS

Qualcomm Europe: "DL Carrier Aggregation Performance in Heterogeneous Networks", [online], 3GPP TSG-RAN WG1#58, R1-093145, URL: http://www.3gpp.org/ftp/tsg_ran/WG1_RL1/ SGR1_58/Docs/R1-093145.zip.

Qualcomm Incorporated: "Extending Rel-8/9 ICIC into Rel-10", 3GPP Draft; R1-101505 Extending REL-8-9 ICIC Into REL-10, 3rd Generation Partnership Project (3GPP), Mobile Competence Centre ; 650, Route Des Lucioles ; F-06921 Sophia-Antipolis Cedex ; France, vol. RAN WG1, no. San Francisco, USA; Feb. 22, 2010, Feb. 16, 2010, XP050418951, [retrieved on Feb. 16, 2010].

3GPP TS 36.355 V9.0.0, Technical Specification Group Radio Access Network, E-UTRA, "LTE Positioning Protocal (LLP) (Release 9)" Dec. 2009, 31 pages.

Alcatel-Lucent, "Interference Coordination Framework with Results", 3GPP TSG RAN WG1 Meeting #49bis, R1-07-3187, Jun. 29, 2007, pp. 1-9.

Huawei, "Consideration on CSI-RS design for CoMP and text proposal to 36.814", 3GPP TSG-RAN WG1#57b R1-092364, Los Angeles, USA, Jun. 29-Jul. 3, 2009.

LG Electronics: "Coordination for DL control channel in co-channel HeNB deployment", 3GPP Draft; R1-102429 Control Channel in Hetnet, 3rd Generation Partnership Project (3GPP), Mobile Competence Centre ; 650, Route Des Lucioles ; F-06921 Sophia-Antipolis Cedex ; France, vol. RAN WG1, no. Beijing, china; Apr. 12, 2010, Apr. 6, 2010, XP050419640, [retrieved on Apr. 6, 2010].

NTT DoCoMo: "Interference Coordination for Non-CA-based Heterogeneous Networks", 3GPP Draft; R1-102307 ICIC for Non-CA Hetnet, 3rd Generation Partnership Project (3GPP), Mobile Competence Centre ; 650, Route Des Lucioles ; F-06921 Sophia-Antipolis Cedex ; France, vol. RAN WG1, no. Beijing, china; Apr. 12, 2010, Apr. 7, 2010, XP050419698, [retrieved on Apr. 7, 2010].

NTT DoCoMo, "Performance Evaluations of Heterogeneous Networks", 3GPP TSG RAN WG1 Meeting #60, R1-101226, Feb. 26, 2010, pp. 1-18.

Qualcomm Europe: "Coordinated Multi-Point downlink transmission in LTE-Advanced" 3GPP Draft; R1-084400 COMP, 3rd Generation Partnership Project (3GPP), Mobile Competence Centre; 650, Route Des Lucioles ; F-06921 Sophia-Antipolis Cedex; France, no. Prague, Czech Republic; Nov. 5, 2008, XP050317663.

3GPP: "LS on RV Determination for BCCH," 3GPP TSG RAN WG1 Meeting #54bis, Sep. 29, 2008, R1-084067, <URL: http://www.3gpp.org/ftp/tsg_ran/WG1_RL1/TSGR1_54b/Docs/R1-084067.zip>.

3GPP TSG-RAN WG2 Meeting #68 R2-096531, "Email discussion on MBMS value range [67b#14]", Nov. 9-13, 2009, Jeju, Korea, Discussion and Decision, <URL: http://www.3gpp.org/ftp/tsg_ran/WG2_RL2/TSGR2_68/Docs/R2-096531.zip>, page No. 1-13.

Catt,Addition of MBSFN information on X2 interface,[online],3GPPTSG-RAN3 Meeting #64,May 4, 2009,R3-091247, Internet<URL:http://www.3gpp.org/ftp/tsg_ran/WG3_lu/TSGR3_64/Docs/R3-091247.zip>, page No. 1-14.

Motorola: "DCI Format 1C with implicit RV and TBS," 3GPP TSG RAN1 #54, Aug. 18, 2008, R1-083207, 5 pages, <URL: http://www.3gpp.org/ftp/tsg_ran/WG1_RL1/TSGR1_54/Docs/R1-083207.zip>.

LG Electronics: "Considerations on interference coordination in heterogeneous networks", 3GPP Draft ; R1-101369, 3rd Generation Partnership Project (3GPP), Mobile Competence Centre; 650, Route Des Lucioles ; F-06921 Sophia-Antipolis Cedex ; France, vol. RAN WGI, no. San Francisco, USA; Feb. 22, 2010-Feb. 26, 2010, Feb. 16, 2010, XP050418854, pp. 1-5.

NTT DoCoMo: "Downlink Interference Coordination Between eNodeB and Home eNodeB", 36PP Draft; R1-101225 HENB_ICIC, 3rd Generation Partnership Project (3GPP), Mobile Competence Centre ; 650, Route Des Lucioles ; F-06921 Sophia-Antipolis Cedex ; France, vol. RAN WGI, no. San Francisco, USA; Feb. 22, 2010, Feb. 16, 2010, XP050418740, [retrieved on Feb. 16, 2010]., p. 1-8.

Texas Instruments: "Issues on Carrier Aggregation for Advanced E-UTRA", 3GPP Draft, R1-090280 TI Carrier AGGR, 3rd Generation Partnership Project (3GPP), Mobile Competence Centre, 650, Route Des Lucioles, F-06921 Sophia-Antipolis Cedex, France, no. Ljubljana, Jan. 7, 2009, XP050318205, pp. 1-5, [retrieved on Jan. 7, 2009].

3GPP TS 36.355 V9.0.0, LTE Positioning Protocol (LPP), Dec. 2009, http://www.3gpp.org/ftp/Specs/archive/36_series/36.355/36355-900.zip 3GPP TSG RAN WG2 #62bis, Ericsson, E-UTRA UE Radio Measurement Reporting for Uplink ICIC, R2-083147, Jul. 2008, http://www.3gpp.org/FTP/tsg_ran/WG2_RL2/TSGR2_62bis/Docs/R2-083147.zip.

LG-NORTEL: "Interference under Type 1 RN", 3GPP TSG-RAN WG1#57, R1-092184, 14 pages, May 4, 2009.

Qualcomm Europe, "Carrier Aggregation in Heterogeneous Networks", 3GPP TSG RAN WG1 #56bis, R1-091459, pp. 1-12, Seoul, Korea, Mar. 23-27, 2009.

Interdigital Communications: "eICIC Macro-Femto: Time-domain muting and ABS", 3GPP TSG-RAN WG1#63, R1-105951, Nov. 15 2010, 6 Pages, URL: http://www.3gpp.org/ftp/tsg_ran/WG1_RL1/TSGR1_63/Docs/R1-105951.zip.

Gaie C., et al., "Distributed Discrete Resource Optimization in Heterogeneous Networks," IEEE, 2008, pp. 560-564.

Ericsson, Considerations on Non-CA based Heterogeneous Deployments, 3GPP TSG-RAN WG1 #61, R1-102618, ST-Ericsson, 2010, 3 Pages.

LG Electronics, Coordination for DL Control Channel in Co-Channel CSG Deployment, 3GPP TSG RAN WG1 Meeting #61, R1-102704, 2010, 8 Pages.

Lopez-Perez D., et al., "OFDMA femtocells: A roadmap on interference avoidance", IEEE Communications Magazine, IEEE Service Center, Piscataway, US, vol. 47, No. 9, Sep. 1, 2009, pp. 41-48, XP011283364, ISSN: 0163-6804, DOI: 10.1109/MCOM.2009.5277454.

Motorola: "HeNB Interference Management", 3GPP TSG-RAN WG1#60 R1-101121, <URL:http://www.3gpp.org/ftp/tsg_ran/WG1_RL1/TSGR1_60/Docs/R1-101121.zip>, Feb. 17, 2010, 4 Pages.

Nortel: "Discussions on LTE mobility performance evaluation", 3GPP TSG-RAN WG1#57 R1-091913, <URL:http://www.3gpp.org/ftp/tsg_ran/WG1_RL1/TSGR1_57/Docs/R1-091913.zip>, May 9, 2009, 3 Pages.

Qualcomm Incorporated: "Measurements and feedback extensions for improved operations in HetNets", 3GPP TSG-RAN WG1#60b R1-102353, <URL:http://www.3gpp.org/ftp/tsg_ran/WG1_RL1/TSGR1_60b/Docs/R1-102353.zip>, Apr. 6, 2010, 3 Pages.

TSG-RAN WG4: "Reply to LS on mobility evaluation" 3GPP TSG-RAN WG1#60 R1-100979, <URL: http://www.3gpp.org/ftp/tsg_ran/WG4_Radio/TSGR4_50bis/Documents/R4-091518.zip>, Mar. 30, 2009, 3 Pages.

ZTE: "Scenarios and Specification Impact of Type 2 Relay", 3GPP TSG-RAN WG1#60 R1-100979, <URL: http://www.3gpp.org/ftp/tsg_ran/WG1_RL1/TSGR1_60/Docs/R1-100979.zip>, Feb. 16, 2010, 7 Pages.

* cited by examiner

METHOD AND APPARATUS FOR SUPPORTING COMMUNICATIONS IN A HETEROGENEOUS NETWORK

CROSS-REFERENCE TO RELATED APPLICATION(S)

This application claims the benefit of U.S. Provisional Application Ser. No. 61/323,853, entitled "METHOD AND APPARATUS FOR SUPPORTING COMMUNICATIONS IN A HETEROGENEOUS NETWORK" and filed on Apr. 13, 2010, which is expressly incorporated by reference herein in its entirety.

BACKGROUND

1. Field

The present disclosure relates generally to communication systems, and more particularly, to techniques for supporting downlink communications in a heterogeneous wireless communication network.

2. Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

For example, a wireless communication network may include a number of evolved Node Bs (eNBs) that can support communication for a number of user equipments (UEs). A UE may communicate with an eNB via the downlink and uplink. The downlink (or forward link) refers to the communication link from the eNB to the UE, and the uplink (or reverse link) refers to the communication link from the UE to the eNB.

An eNB may transmit data and control information on the downlink to a UE and/or may receive data and control information on the uplink from the UE. On the downlink, a transmission from the eNB may observe interference due to transmissions from neighbor eNBs. On the uplink, a transmission from the UE may cause interference to transmissions from other UEs communicating with the neighbor ENBs. This interference may degrade performance on both the downlink and uplink. As such, interference coordination schemes for wireless communications networks are desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Various aspects of the disclosure may relate to the delivery of broadcast system information to user equipment in a wireless communication network, where the network uses interference coordination schemes that may conflict with the required transmission timing of the broadcast system information. These aspects may also include methods to deliver such information in light of the need to maintain support for legacy devices that do not support new delivery methods. These various aspects may include, but are not limited to, the negotiation of orthogonal resource allocation to avoid conflicts, the shifting or duplication of the broadcast system information based on interference coordination schemes, and the introduction of new or modified information delivery methods.

According to one aspect, a method for facilitating one or more interference coordination schemes is provided. The method may include determining broadcast channel scheduling information for one or more broadcasts of a payload by a broadcast channel associated with a first base station based on one or more broadcast channel interference coordination schemes, wherein reception of the broadcast channel associated with the first base station is interfered at least in part based on one or more transmissions from a second base station. Moreover, the method may include receiving the payload based on the determined broadcast channel scheduling information.

Yet another aspect relates to at least one processor configured to facilitate one or more interference coordination schemes. The processor may include a first module for determining broadcast channel scheduling information for one or more broadcasts of a payload by a broadcast channel associated with a first base station based on one or more broadcast channel interference coordination schemes, wherein reception of the broadcast channel associated with the first base station is interfered at least in part based on one or more transmissions from a second base station. Moreover, the processor may include a second module for receiving the payload based on the determined broadcast channel scheduling information.

Still another aspect relates to a computer program product comprising a computer-readable medium. The computer program product may include a computer-readable medium including a first set of codes for causing a computer to determine broadcast channel scheduling information for one or more broadcasts of a payload by a broadcast channel associated with a first base station based on one or more broadcast channel interference coordination schemes, wherein reception of the broadcast channel associated with the first base station is interfered at least in part based on one or more transmissions from a second base station. The computer program product may further include a computer-readable medium including a second set of codes for causing the computer to receive the payload based on the determined broadcast channel scheduling information.

Yet another aspect relates to an apparatus. The apparatus may include means for determining broadcast channel scheduling information for one or more broadcasts of a payload by a broadcast channel associated with a first base station based on one or more broadcast channel interference coordination schemes, wherein reception of the broadcast channel associated with the first base station is interfered at least in part based on one or more transmissions from a second base station. Moreover, the apparatus may include means for receiving the payload based on the determined broadcast channel scheduling information.

Another aspect relates to an apparatus. The apparatus may include a interference coordination module for determining broadcast channel scheduling information for one or more broadcasts of a payload by a broadcast channel associated with a first base station based on one or more broadcast channel interference coordination schemes, wherein reception of the broadcast channel associated with the first base station is interfered at least in part based on one or more transmissions from a second base station. Further, the apparatus may include a receiver for receiving the payload based on the determined broadcast channel scheduling information.

According to one aspect, another method for facilitating one or more interference coordination schemes is provided. The method may include transmitting, by the first base station, broadcast channel scheduling information for a payload associated with the first base station based on one or more broadcast channel interference coordination schemes, wherein interference from a second base station interferes with reception of the broadcast channel scheduling information broadcast by the first base station. Moreover, the method may include transmitting the payload based on the one or more broadcast channel interference schemes.

Yet another aspect relates to at least one processor configured to facilitate one or more interference coordination schemes. The processor may include a first module for transmitting, by a first base station, broadcast channel scheduling information for a payload associated with the first base station based on one or more broadcast channel interference coordination schemes, wherein interference from a second base station interferes with reception of the broadcast channel scheduling information broadcast by the first base station. Moreover, the processor may include a second module for transmitting the payload based on the one or more broadcast channel interference schemes.

Still another aspect relates to a computer program product comprising a computer-readable medium. The computer program product may include a computer-readable medium including a first set of codes for causing a computer to transmit broadcast channel scheduling information for a payload associated with the first base station based on one or more broadcast channel interference coordination schemes, wherein interference from a second base station interferes with reception of the broadcast channel scheduling information broadcast by the first base station. The computer program product may further include a computer-readable medium including a second set of codes for causing the computer to transmit the payload based on the one or more broadcast channel interference schemes.

Yet another aspect relates to an apparatus. The apparatus may include means for transmitting, by a first base station, broadcast channel scheduling information for a payload associated with the first base station based on one or more broadcast channel interference coordination schemes, wherein interference from a second base station interferes with reception of the broadcast channel scheduling information broadcast by the first base station. Moreover, the apparatus may include means for transmitting the payload based on the one or more broadcast channel interference schemes.

Another aspect relates to an apparatus. The apparatus may include an interference coordination module for transmitting, by a first base station, broadcast channel scheduling information for a payload associated with the first base station based on one or more broadcast channel interference coordination schemes, wherein interference from a second base station interferes with reception of the broadcast channel scheduling information broadcast by the first base station. Further, the apparatus may include a transmitter for transmitting the payload based on the one or more broadcast channel interference schemes.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
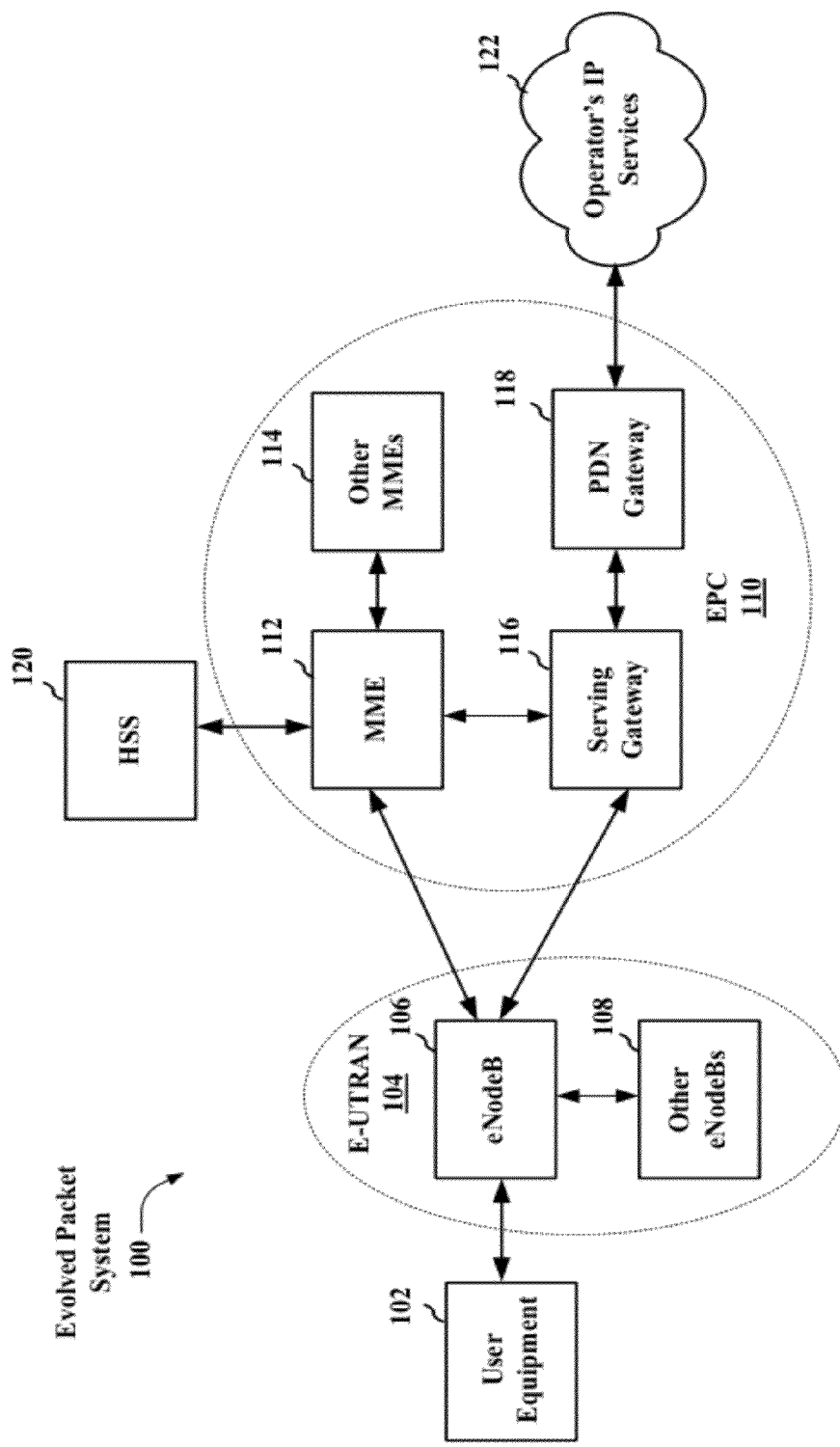
FIG. 1 is a diagram illustrating an example of a network architecture.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawing by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. The computer-readable medium may be a non-transitory computer-readable medium. A non-transitory computer-readable medium include, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium may be resident in the processing system, external to the processing system, or distributed across multiple entities including the processing system. The computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

FIG. 1 is a diagram illustrating an LTE network architecture employing various communication devices. LTE network architecture may be referred to as an Evolved Packet System (EPS) 100. EPS 100 may include one or more user equipment (UE) 102, an Evolved UMTS Terrestrial Radio Access Network (E-UTRAN) 104, an Evolved Packet Core (EPC) 110, a Home Subscriber Server (HSS) 120, and an Operator's IP Services 122. EPS 100 can interconnect with other access networks, but for simplicity those entities/interfaces are not shown. As shown, EPS 100 provides packet-switched services, however, as those skilled in the art will readily appreciate, the various concepts presented throughout this disclosure may be extended to networks providing circuit-switched services.

E-UTRAN includes evolved Node B (eNB) 106 and other eNBs 108. The eNB 106 provides user and control plane protocol terminations toward UE 102. The eNB 106 may be connected to other eNBs 108 via an X2 interface (i.e., backhaul). The eNB 106 may also be referred to by those skilled in the art as a base station, a base transceiver station, a radio base station, a radio transceiver, a transceiver function, a basic service set (BSS), an extended service set (ESS), or some other suitable terminology. The eNB 106 provides an access point to EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, or any other similar functioning device. UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected by an S1 interface to EPC 110. EPC 110 includes a Mobility Management Entity (MME) 112, other MMEs 114, a Serving Gateway 116, and a Packet Data Network (PDN) Gateway 118. MME 112 is the control node that processes the signaling between UE 102 and EPC 110. Generally, MME 112 provides bearer and connection management. All user IP packets are transferred through Serving Gateway 116, which itself is connected to PDN Gateway 118. PDN Gateway 118 provides UE IP address allocation as well as other functions. PDN Gateway 118 is connected to Operator's IP Services 122. Operator's IP Services 122 include the Internet, the Intranet, an IP Multimedia Subsystem (IMS), and a PS Streaming Service (PSS).

Figure 2:
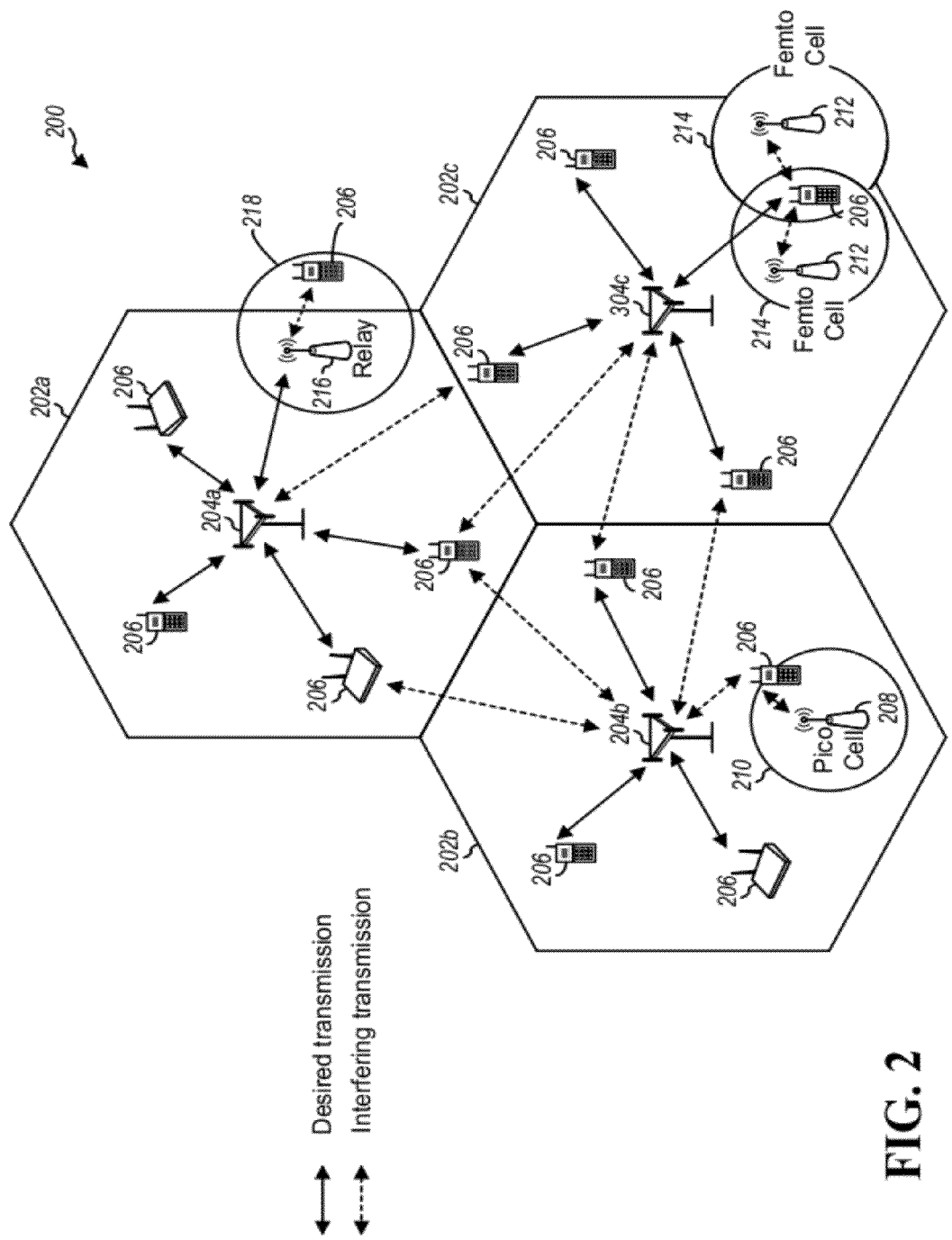
FIG. 2 is a diagram illustrating an example of an access network.

FIG. 2 is a diagram illustrating an example of an access network 200 in an LTE network architecture. In this example, access network 200 is divided into a number of cellular regions (cells) 202. One or more lower power class eNBs 208, 212, 216 may have cellular regions 210, 214, 218, respectively, that overlap with and/or expand one or more of cells 202. Lower power class eNBs 208, 212, 216 may include femto cells (e.g., home eNBs (HeNBs)), pico cells, relays or micro cells. A higher power class or macro eNB 204 is assigned to a cell 202 and is configured to provide an access point to EPC 110 for all UEs 206 in cell 202. A macro cell may cover a relatively large geographic area (e.g., several kilometers in radius) and may allow unrestricted access by UEs 206 with service subscription. A pico cell may cover a relatively small geographic area and may allow unrestricted access by UEs 206 with service subscription. A femto cell may cover a relatively small geographic area (e.g., a home) and may allow restricted access by UEs 206 having association with the femto cell (e.g., UEs in a Closed Subscriber Group (CSG), UEs for users in the home, etc.). A relay station is a station that receives a transmission of data and/or other information from an upstream station (e.g., an eNB or a UE) and sends a transmission of the data and/or other information to a downstream station (e.g., a UE or an eNB). A relay station may also be a UE 206 that relays transmissions for other UEs 206. In the example shown in FIG. 2, a relay station 216 may communicate with eNB 204 and a UE 206 in order to expend coverage 218 and facilitate communication between eNB 204 and UE 206. A relay station may also be referred to as a relay eNB, a relay, etc. An eNB for a macro cell may be referred to as a macro eNB. An eNB for a pico cell may be referred to as a pico eNB. An eNB for a femto cell may be referred to as a femto eNB or a home eNB. Different types of eNBs 204 may have different transmit power levels, different coverage areas, and different impact on interference in wireless network 200. For example, macro eNBs may have a high transmit power level (e.g., 20 Watts) whereas pico eNBs, femto eNBs and relays may have a lower transmit power level (e.g., 1 Watt). There is no centralized controller in this example of an access network 200, but a centralized controller may be used in alternative configurations. The eNB 204 is responsible for all radio related functions including radio bearer control, admission control, mobility control, scheduling, security, and connectivity to serving gateway 116 (see FIG. 1).

The modulation and multiple access scheme employed by access network 200 may vary depending on the particular telecommunications standard being deployed. In LTE applications, OFDM is used on the DL and SC-FDMA is used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNB 204 may have multiple antennas supporting MIMO technology. The use of MIMO technology enables eNB 204 to exploit the spatial domain to support spatial multiplexing, beamforming, and transmit diversity.

In the detailed description that follows, various aspects of an access network will be described with reference to a MIMO system supporting OFDM on the downlink. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The uplink may use SC-FDMA in the form of a DFT-spread OFDM signal to compensate for high peak-to-average power ratio (PARR).

Figure 3:
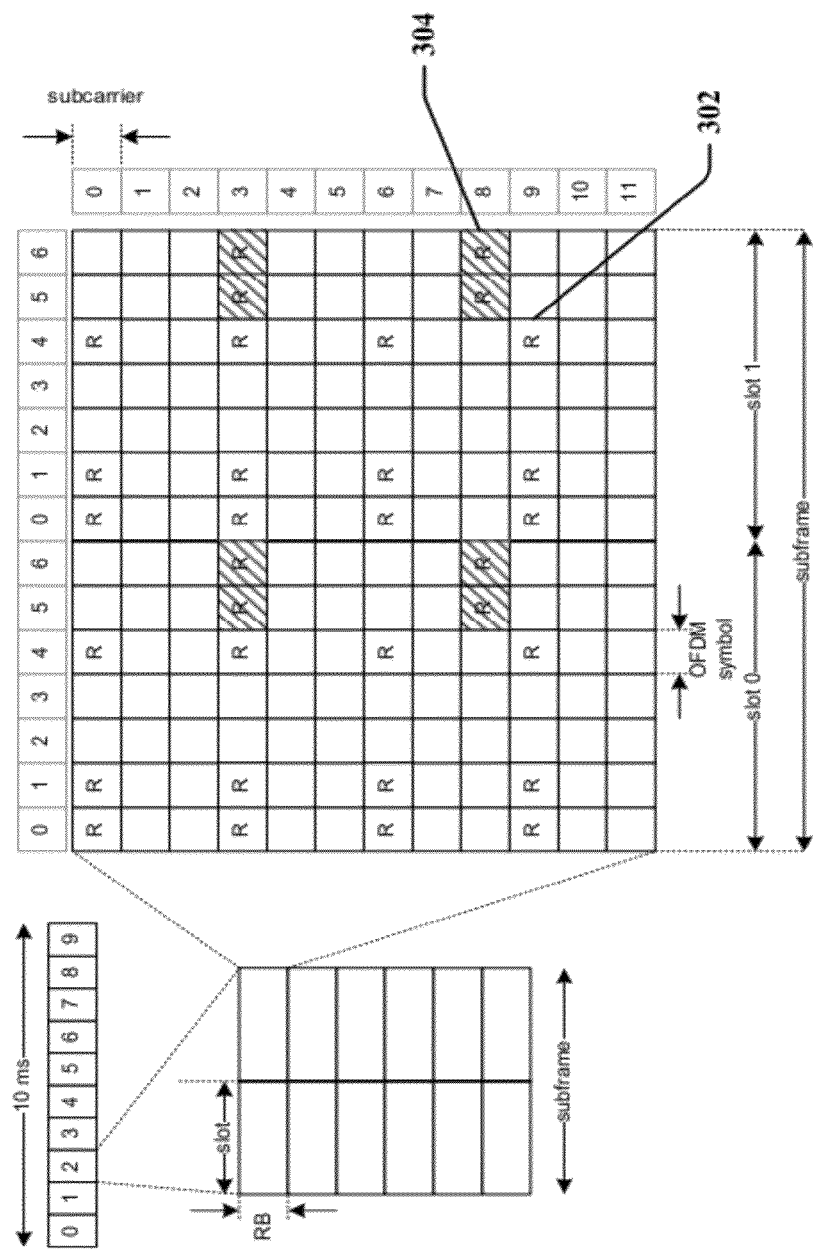
FIG. 3 is a diagram illustrating an example of a frame structure for use in an access network.

Various frame structures may be used to support the DL and UL transmissions. FIG. 3 presents an example of a DL frame structure. However, as those skilled in the art will readily appreciate, the frame structure for any particular application may be different depending on any number of factors. In this example, a frame (10 ms) is divided into 10 equally sized sub-frames. Each sub-frame includes two consecutive time slots.

A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. Some of the resource elements, as indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical downlink shared channel (PDSCH) is mapped. The number of bits carried by each resource element depends on the modulation scheme. Thus, the more resource blocks that a UE receives and the higher the modulation scheme, the higher the data rate for the UE.

Figure 4:
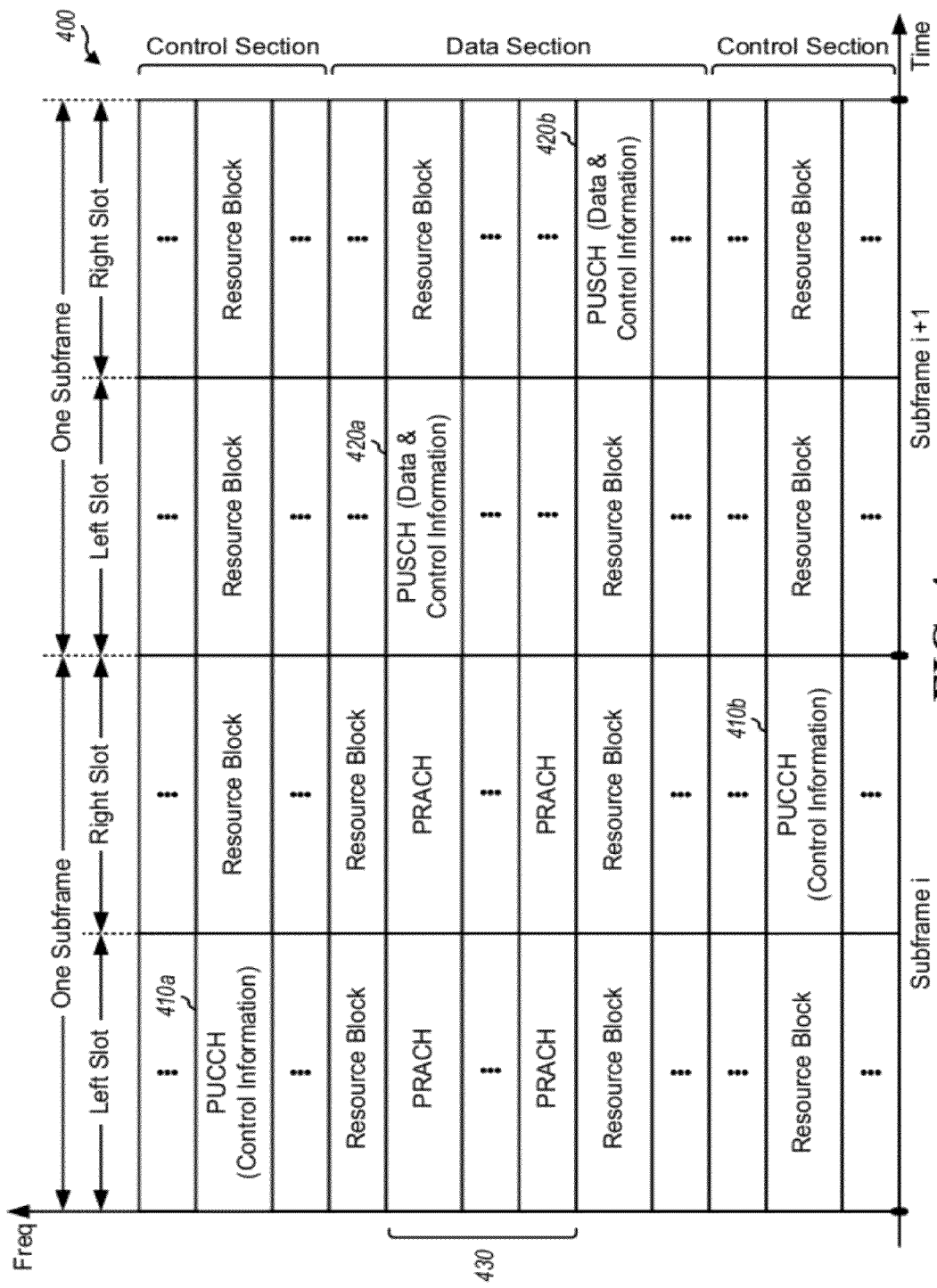
FIG. 4 shows an exemplary format for the UL in LTE.

FIG. 4 shows an exemplary format of an UL frame structure 400 in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The design in FIG. 4 results in the data section including contiguous subcarriers, which may allow a single UE to be assigned all of the contiguous subcarriers in the data section.

A UE may be assigned resource blocks 410*a*, 410*b* in the control section to transmit control information to an eNB. The UE may also be assigned resource blocks 420*a*, 420*b* in the data section to transmit data to the eNB. The UE may transmit control information in a physical uplink control channel (PUCCH) on the assigned resource blocks in the control section. The UE may transmit only data or both data and control information in a physical uplink shared channel (PUSCH) on the assigned resource blocks in the data section. A UL transmission may span both slots of a subframe and may hop across frequency as shown in FIG. 4.

FIG. 4 illustrates a set of resource blocks may be used to perform initial system access and achieve UL synchronization in a physical random access channel (PRACH) 430. PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) and a UE can make only a single PRACH attempt per frame (10 ms).

Figure 5:
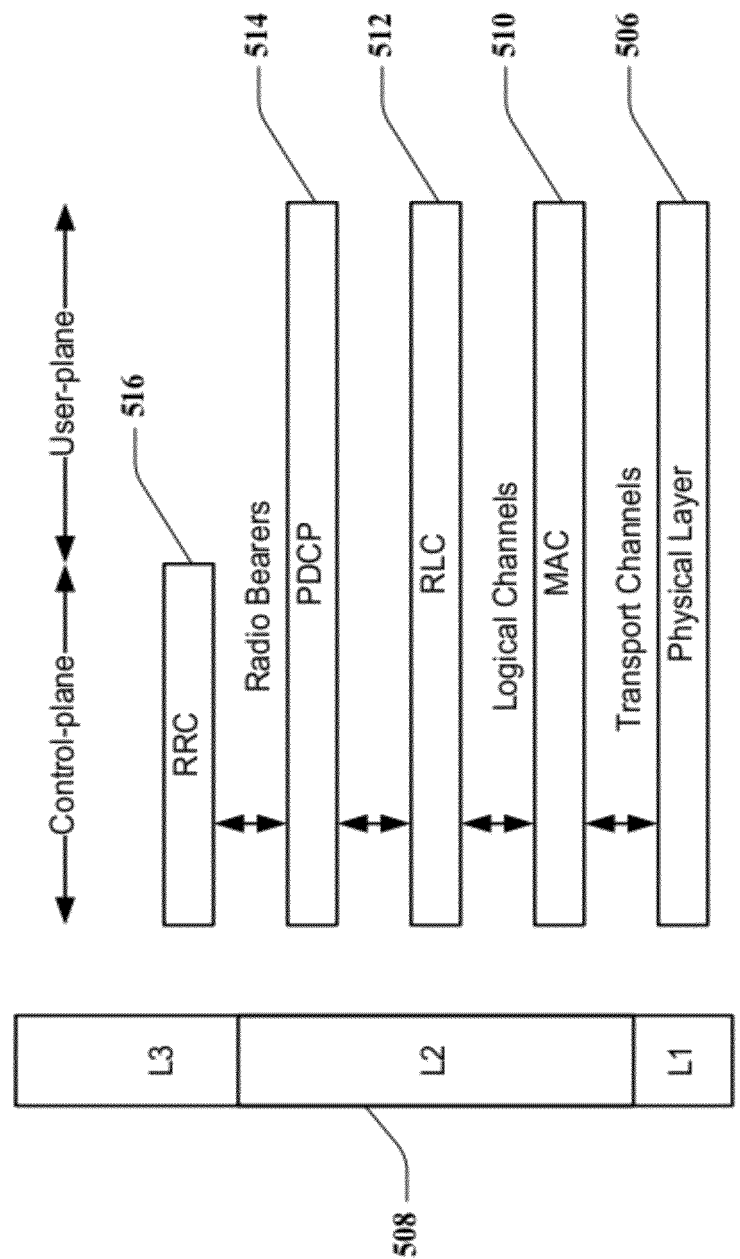
FIG. 5 is a diagram illustrating an example of a radio protocol architecture for the user and control plane.

The radio protocol architecture may take on various forms depending on the particular application. FIG. 5 is a conceptual diagram illustrating an example of the radio protocol architecture for the user and control planes.

In FIG. 5, the radio protocol architecture for the UE and the eNB is shown with three layers: Layer 1, Layer 2, and Layer 3. Layer 1 is the lowest layer and implements various physical layer signal processing functions. Layer 1 will be referred to herein as physical layer 506. Layer 2 (L2 layer) 508 is above physical layer 506 and is responsible for the link between the UE and eNB over physical layer 506.

In the user plane, L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above L2 layer 508 including a network layer (e.g., IP layer) that is terminated at PDN gateway 108 (see FIG. 1) on the network side, and an application layer that is terminated at the other end of the connection (e.g., a remote UE, server, etc.).

PDCP sublayer 514 provides multiplexing between different radio bearers and logical channels. PDCP sublayer 514 also provides header compression for upper layer data packets to reduce radio transmission overhead, security by ciphering the data packets, and handover support for UEs between eNBs. RLC sublayer 512 provides segmentation and reassembly of upper layer data packets, retransmission of lost data packets, and reordering of data packets to compensate for out-of-order reception due to hybrid automatic repeat request (HARQ). MAC sublayer 510 provides multiplexing between logical and transport channels. MAC sublayer 510 is also responsible for allocating the various radio resources (e.g., resource blocks) in one cell among the UEs. MAC sublayer 510 is also responsible for HARQ operations.

In the control plane, the radio protocol architecture for the UE and eNB is substantially the same for physical layer 506 and L2 layer 508 with the exception that there is no header compression function for the control plane. The control plane also includes a radio resource control (RRC) sublayer 516 in Layer 3. RRC sublayer 516 is responsible for obtaining radio resources (i.e., radio bearers) and for configuring the lower layers using RRC signaling between the eNB and the UE.

Figure 6:
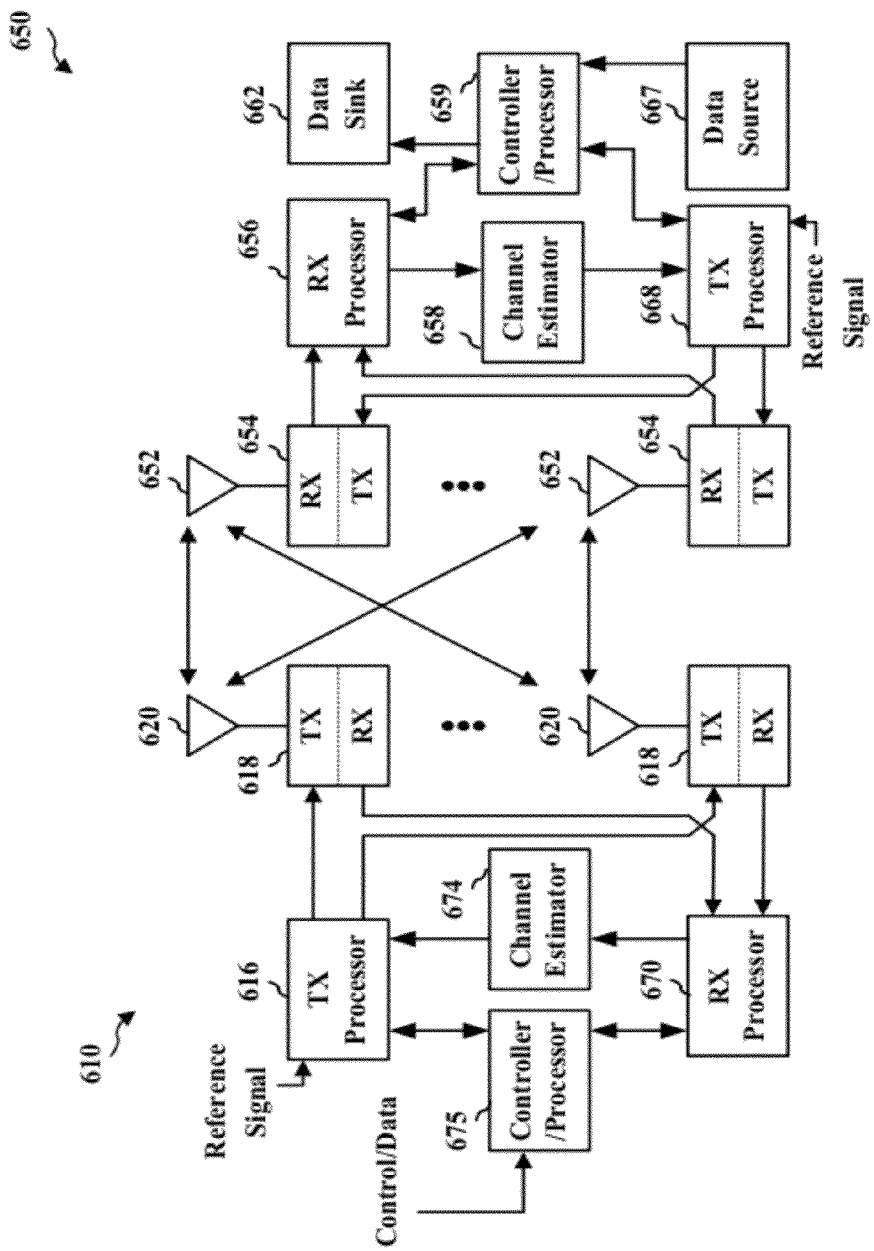
FIG. 6 is a diagram illustrating an example of an evolved Node B and user equipment in an access network.

FIG. 6 is a block diagram of an eNB 610 in communication with a UE 650 in an access network. In the DL, upper layer packets from the core network are provided to a controller/processor 675. Controller/processor 675 implements the functionality of the L2 layer described earlier in connection with FIG. 5. In DL, controller/processor 675 provides header compression, ciphering, packet segmentation and reordering, multiplexing between logical and transport channels, and radio resource allocations to UE 650 based on various priority metrics. Controller/processor 675 is also responsible for HARQ operations, retransmission of lost packets, and signaling to UE 650.

TX processor 616 implements various signal processing functions for the L1 layer (i.e., physical layer). The signal processing functions includes coding and interleaving to facilitate forward error correction (FEC) at UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by UE 650. Each spatial stream is then provided to a different antenna 620 via a separate transmitter 618TX. Each transmitter 618TX modulates an RF carrier with a respective spatial stream for transmission.

At UE 650, each receiver 654RX receives a signal through its respective antenna 652. Each receiver 654RX recovers information modulated onto an RF carrier and provides the information to receiver (RX) processor 656.

RX processor 656 implements various signal processing functions of the L1 layer. RX processor 656 performs spatial processing on the information to recover any spatial streams destined for UE 650. If multiple spatial streams are destined for UE 650, they may be combined by RX processor 656 into a single OFDM symbol stream. RX processor 656 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, is recovered and demodulated by determining the most likely signal constellation points transmitted by eNB 610. These soft decisions may be based on channel estimates computed by channel estimator 658. The soft decisions are then decoded and deinterleaved to recover the data and control signals that were originally transmitted by eNB 610 on the physical channel. The data and control signals are then provided to controller/processor 659.

Controller/processor 659 implements the L2 layer described earlier in connection with FIG. 5. In the UL, control/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to data sink 662 for L3 processing. Controller/processor 659 is also responsible for error detection using an acknowledgement (ACK) and/or negative acknowledgement (NACK) protocol to support HARQ operations.

In the UL, a data source 667 is used to provide upper layer packets to controller/processor 659. Data source 667 represents all protocol layers above the L2 layer (L2). Similar to the functionality described in connection with the DL transmission by eNB 610, controller/processor 659 implements the L2 layer for the user plane and the control plane by providing header compression, ciphering, packet segmentation and reordering, and multiplexing between logical and transport channels based on radio resource allocations by eNB 610. Controller/processor 659 is also responsible for HARQ operations, retransmission of lost packets, and signaling to eNB 610.

Channel estimates derived by a channel estimator 658 from a reference signal or feedback transmitted by eNB 610 may be used by TX processor 668 to select the appropriate coding and modulation schemes, and to facilitate spatial processing. The spatial streams generated by TX processor 668 are provided to different antenna 652 via separate transmitters 654TX. Each transmitter 654TX modulates an RF carrier with a respective spatial stream for transmission.

The UL transmission is processed at eNB 610 in a manner similar to that described in connection with the receiver function at UE 650. Each receiver 618RX receives a signal through its respective antenna 620. Each receiver 618RX recovers information modulated onto an RF carrier and provides the information to a RX processor 670. RX processor 670 implements the L1 layer.

Controller/processor 659 implements the L2 layer described earlier in connection with FIG. 5. In the UL, control/processor 659 provides demultiplexing between transport and logical channels, packet reassembly, deciphering, header decompression, control signal processing to recover upper layer packets from UE 650. Upper layer packets from controller/processor 675 may be provided to the core network. Controller/processor 659 is also responsible for error detection using an ACK and/or NACK protocol to support HARQ operations.

EPS 100 described in relation to FIG. 1 includes eNB 610. In particular, eNB 610 includes TX processor 616, RX processor 670, and controller/processor 675. In another aspect, EPS 100 described in relation to FIG. 1 includes UE 650. In particular, UE 650 includes TX processor 668, RX processor 656, and controller/processor 659.

Figure 7:
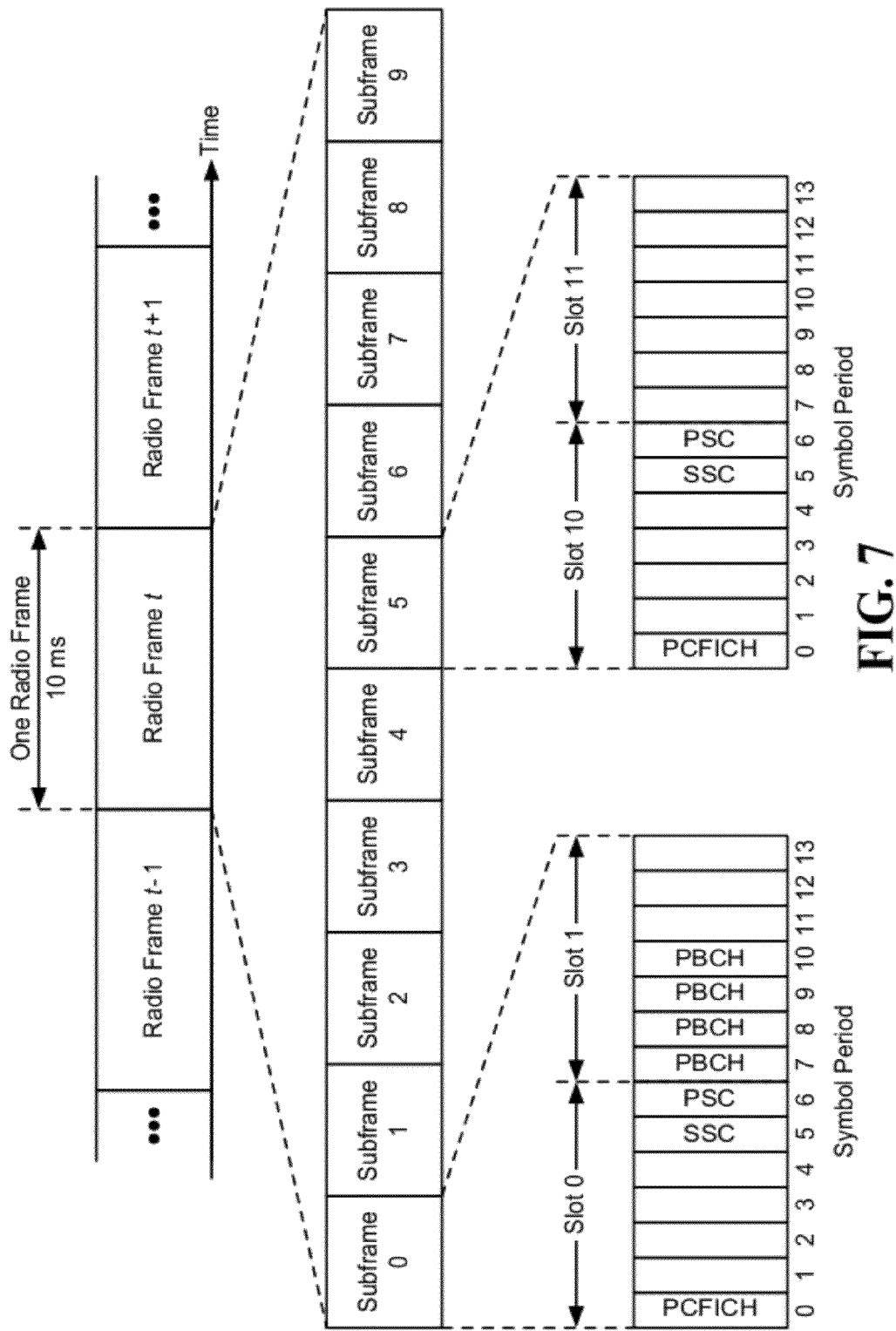
FIG. 7 is a diagram of an example frame structure.

FIG. 7 shows a frame structure used in LTE. The transmission timeline for the downlink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., symbol periods for a normal cyclic prefix (as shown in FIG. 7) or symbol periods for an extended cyclic prefix. The 2L symbol periods in each subframe may be assigned indices of 0 through 2L−1. The available time frequency resources may be partitioned into resource blocks (RBs). Each resource block may cover N subcarriers (e.g., 12 subcarriers) in one slot.

In LTE, an eNB may send broadcast control information and data to a UE. The eNB may send a Physical HARQ Indicator Channel (PHICH) and a Physical Downlink Control Channel (PDCCH) in the first M symbol periods of each subframe (not shown in FIG. 7). The PHICH may carry information to support HARQ. The PDCCH may carry information on resource allocation for UEs and control information for downlink channels. The eNB may send a PDSCH in the remaining symbol periods of each subframe. The PDSCH may carry data for UEs scheduled for data transmission on the downlink. Further, transmission of certain data may be scheduled for defined subframes. For example, system information block type 1, may be scheduled to be transmitted on subframe 5 in certain standards.

A number of resource elements may be available in each symbol period. Each resource element may cover one subcarrier in one symbol period and may be used to send one modulation symbol, which may include a real or complex value. Resource elements not used for a reference signal in each symbol period may be arranged into resource element groups (REGs). Each REG may include four resource elements in one symbol period. The physical control format indicator channel (PCFICH) may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1 and 2. The PDCCH may occupy 9, 18, 32 or 64 REGs, which may be selected from the available REGs, in the first M symbol periods. Certain combinations of REGs may be allowed for the PDCCH.

A UE may be within the coverage of multiple eNBs. One of these eNBs may be selected to serve the UE. The serving eNB may be selected based on various criteria such as received power, pathloss, signal-to-noise ratio (SNR), etc.

Figure 8:
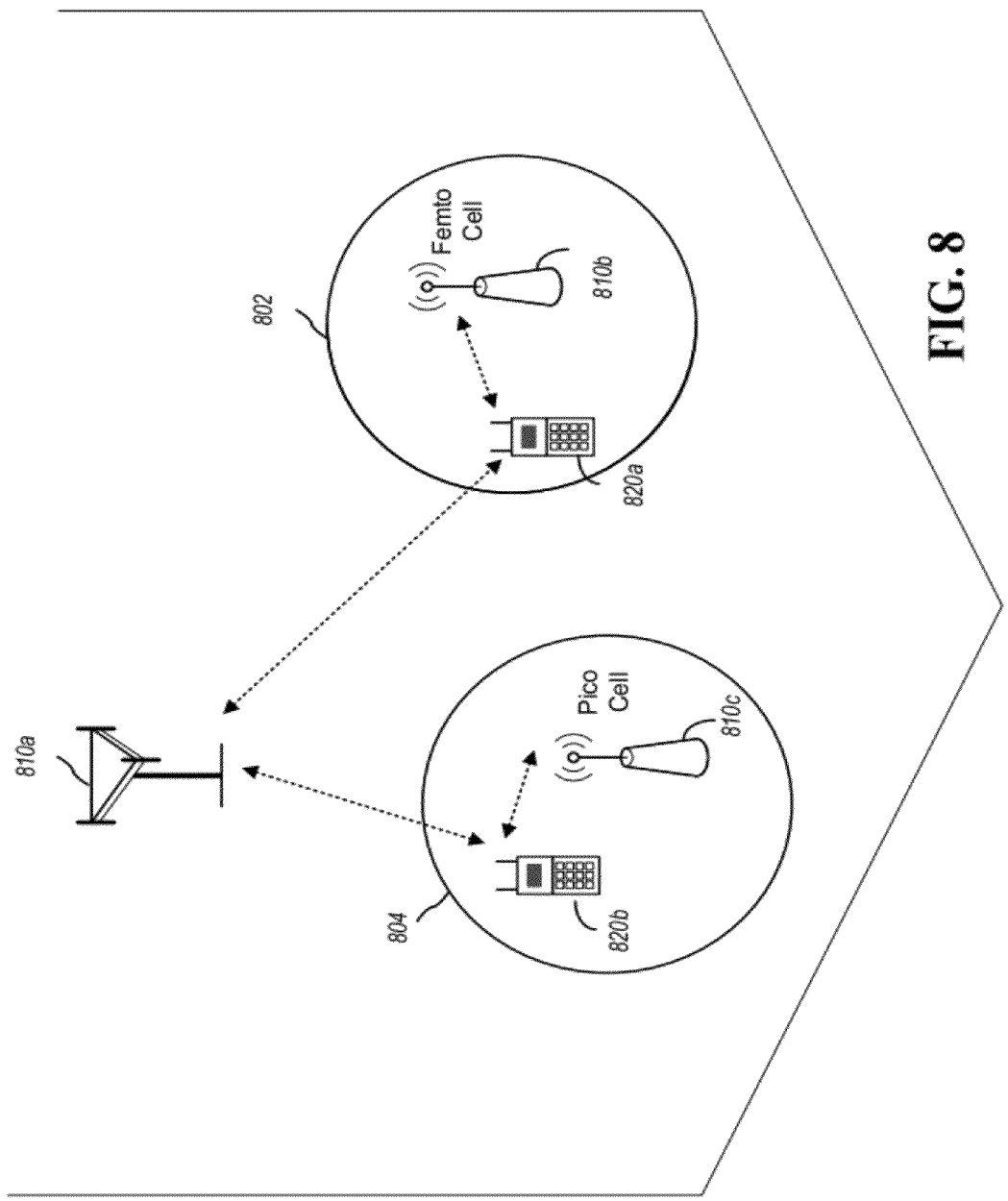
FIG. 8 is a diagram illustrating an example dominant interference scenario in an access network.

A UE may operate in a dominant interference scenario in which the UE may observe high interference from one or more interfering eNBs. A dominant interference scenario may occur due to restricted association. For example, in FIG. 8, UE 820a may be close to femto eNB 810b and may have high received power for eNB 810b. However, UE 820a may not be able to access femto eNB 810b due to restricted association in femto eNB coverage region 802 and may then attempt to connect to macro eNB 810a with lower received power (as shown in FIG. 8) or to a different femto eNB 810b also with lower received power (not shown in FIG. 8). UE 820a may then observe high interference from femto eNB 810b on the downlink and may also cause high interference to femto eNB 810b on the uplink.

A dominant interference scenario may also occur due to range extension, which is a scenario in which a UE connects to an eNB with lower pathloss and lower SNR among all eNBs detected by the UE. For example, in FIG. 8, UE 820b may be located within a coverage region 804 for pico eNB 810c and may detect macro eNB 810a and pico eNB 810c and may have lower received power for pico eNB 810c than macro eNB 810a. Nevertheless, it may be desirable for UE 820b to connect to pico eNB 810c if the pathloss for pico eNB 810c is lower than the pathloss for macro eNB 810a. This may result in less interference to the wireless network for a given data rate for UE 820b.

To address such dominant interference scenarios, a LTE system may use time division multiplexing (TDM) resource partitioning schemes. Using TDM, subframes may be assigned a "type", such as "protected" (U) and "not-use" (N). In LTE, a 8 ms periodicity TDM may be selected in order to align with HARQ processing.

Additionally, as noted above, each radio frame may have a predetermined duration (e.g., 10 ms) and may be partitioned into 10 subframes. Certain transmissions may be assigned to occupy defined subframes, so as to provide devices with a repeated known structure. For example, a system information block type 1 (SIB1) may be scheduled to be transmitted every even radio frame (e.g., every 20 subframes).

In operation, in a dominate interference scenario, these differing periodicities (10 ms vs. 8 ms) may cause interference issues for signals which may use a strict 10 ms periodicity (e.g., SIB1, paging). For example, at certain instances, signals with an 8 ms periodicity transmitted from an aggressor eNB, may interfere with the ability of a UE to receive and decode signals with a 10 ms periodicity transmitted from a victim eNB.

To remedy these potential interference issues, communications in a dominant interference scenario may be supported by one or more interference coordination schemes (e.g., broadcast channel interference coordination schemes). Generally, such interference coordination schemes allow a UE to receive one or more instances of broadcast channel scheduling information, and the UE may in turn use the broadcast channel scheduling information to obtain a payload that may experience interference.

One interference coordination scheme may enable frequency allocation coordination among a first eNB and a second eNB. In such an aspect, the first eNB (e.g., victim eNB) and the second eNB (e.g., aggressor eNB) may coordinate frequency allocation of broadcast channel scheduling information so as to limit potential interference for reception of a payload (e.g., SIB1, paging, etc.) by a UE. Another interference coordination scheme may enable various resources to be reallocated between a second eNB (e.g., an aggressor eNB) and a first eNB (e.g., a victim eNB). For example, in one aspect, the aggressor eNB may transmit broadcast scheduling information for the victim eNB during a timeslot in which a UE may experience interference when attempting to receive a signal from the victim eNB. In another aspect, broadcast scheduling information, received from an aggressor eNB may indicate a clean timeslot for reception of a payload from the victim eNB. In another aspect, scheduling for payload transmissions may be hard coded in a system based on various factors, such as but not limited to, eNB power class. In other words, a UE may schedule reception of a payload from a pico eNB at a timeslot defined for pico eNB payload transmission. Another interference coordination scheme may enable a broadcast scheduling information and/or a payload to be communicated multiple times. The following sections include further discussion of various interference coordination schemes with reference to FIGS. 9, 10 and 11.

Figure 9:
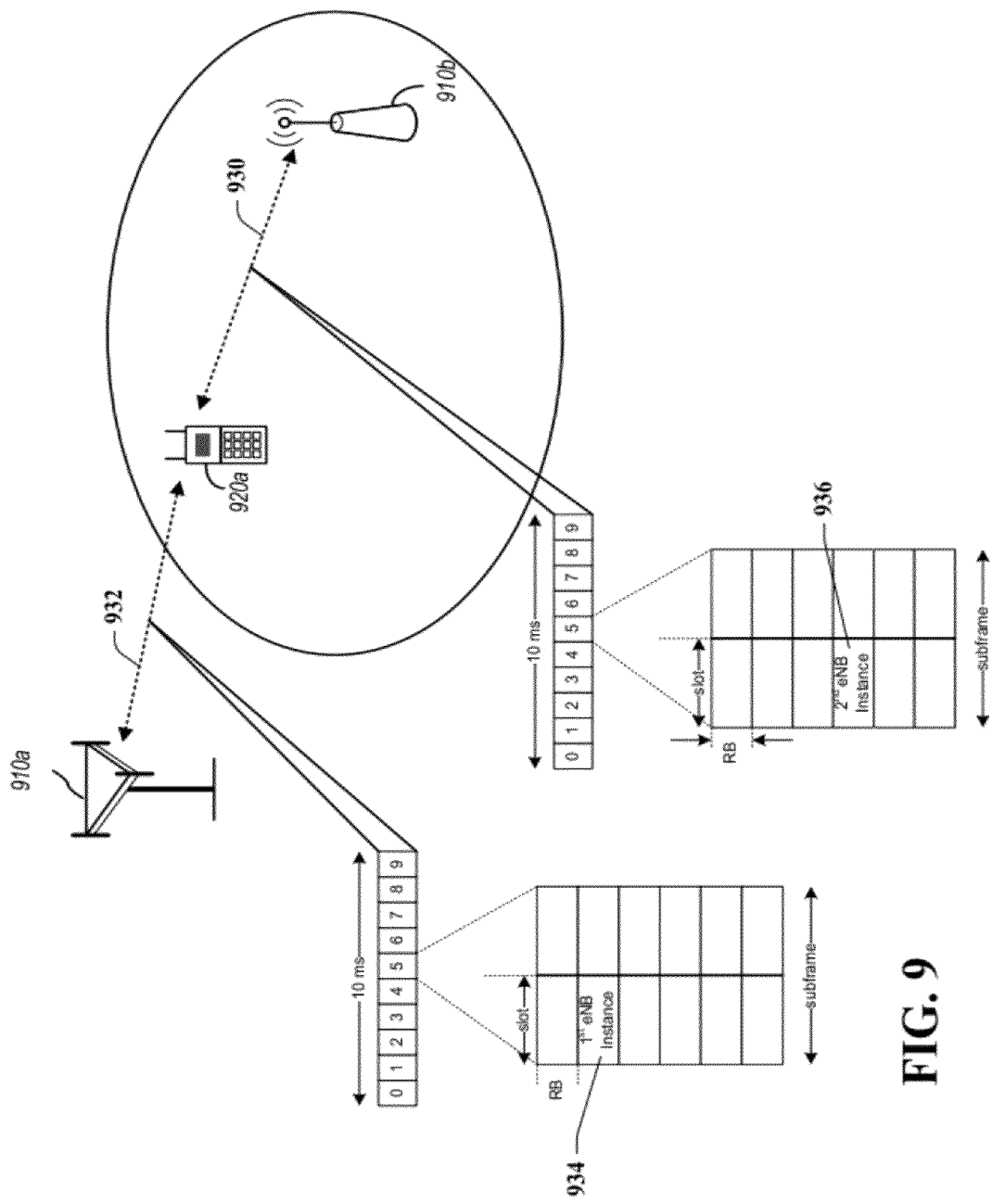
FIG. 9 is a diagram illustrating an example interference coordination scheme in an access network.

I. Allocation of Orthogonal Transmission Resources in Accordance with SIB Transmissions FIG. 9 illustrates a wireless communications system in which an aggressor eNB 910a may interfere with communications between a victim eNB 910b and UE 920a. In FIG. 9, eNB 910b (e.g., victim eNB) and eNB 910a (e.g., aggressor eNB) may coordinate frequency allocation of broadcast channel scheduling information so as to limit potential interference for reception of a payload (e.g., SIB1, paging, etc.) by UE 920a. In operation, eNB 910a may transmit 932 broadcast channel scheduling information associated with eNB 910a using a first frequency 934. Further, eNB 910b may transmit 930 broadcast channel scheduling information associated with eNB 910b using a second frequency 936. In one aspect, first frequency 934 and second frequency 936 may be orthogonally allocated. In such an aspect, aggressor eNB 910a may not transmit on resource blocks (RBs) assigned for payload transmission from eNB 910b.

Figure 10:
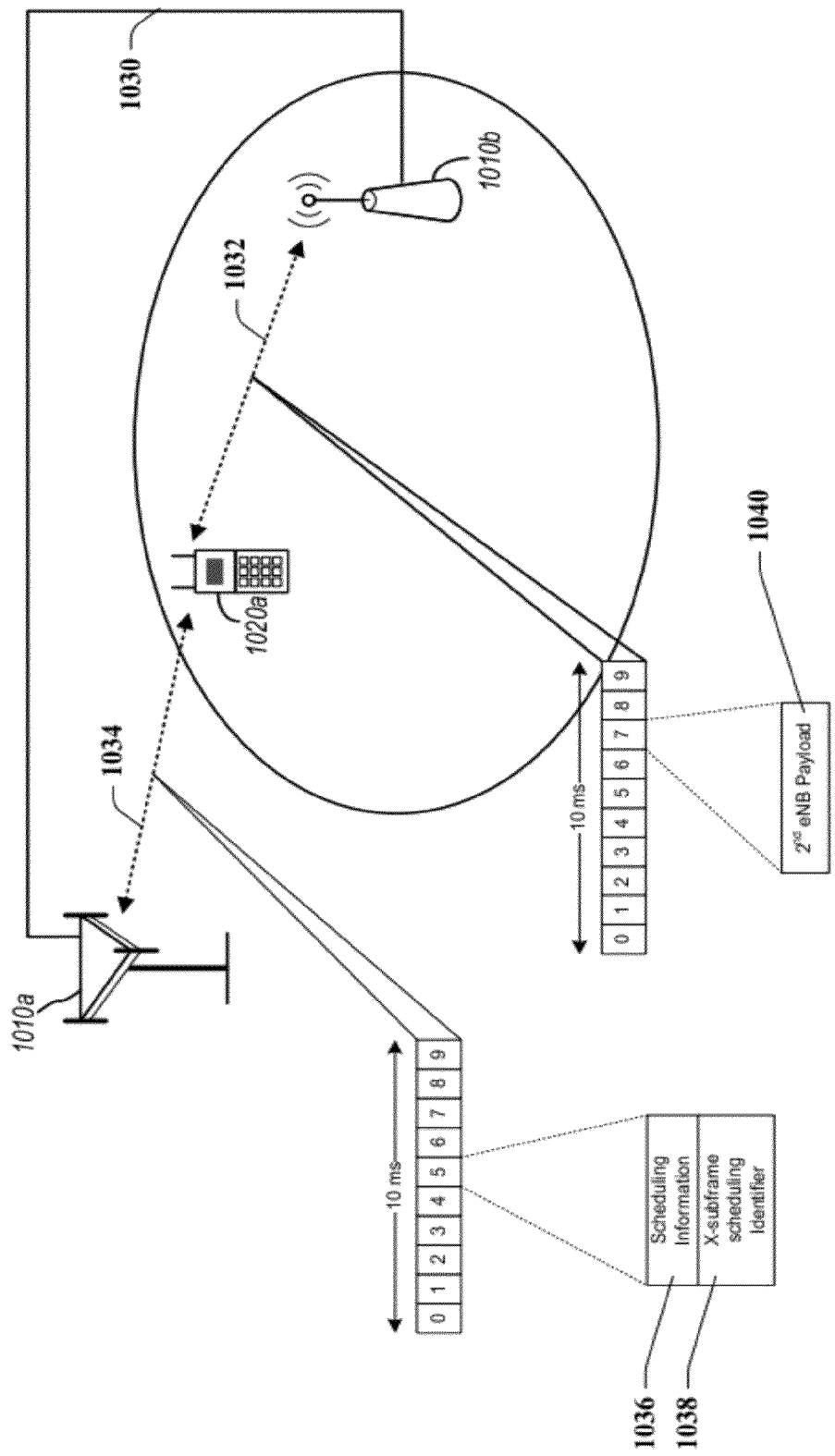
FIG. 10 is another diagram illustrating an example interference coordination scheme in an access network.

II. Rescheduling of SIB Transmissions in Accordance with Allocated Transmission Resources FIG. 10 illustrates still another wireless communications system in which an aggressor eNB 1010a may interfere with communications between a victim eNB 1010b and UE 1020a. In one aspect, scheduling identifier may be used to reference a payload 1040 that may be received during a later subframe. In such an aspect, scheduling identifier may be referred to as a cross subframe scheduling identifier 1038. In operation, eNB 1010a may transmit 1034 broadcast channel scheduling information 1036 associated with eNB 1010a and a cross subframe scheduling identifier 1038 associated with eNB 1010b. In one aspect, eNB 1010a may cross subframe scheduling identifier 1038 over a back-haul connection 1030 between eNB 1010a and eNB 1010b.

While FIG. 10 illustrates scheduling information 1036 and cross subframe scheduling identifier 1038 being transmitted in the same subframe, the example is not limited thereto. For example or alternatively, cross subframe identifier 1038 may be transmitted during a defined subframe k subframes earlier than the payload subframe (n). For example, k may be chosen by an eNB such that n-k is a protected subframe, either statically or dynamically (this information may be known at the eNBs, but unknown at the UE). Moreover, k may be selected such that, $1 \leq k \leq WS$, where WS is window size and may be an integer parameter such that WS<20 and such that there exists at least one protected subframe in the window n-WS, . . . , n−1. Assuming n is a subframe where a payload 1040 is transmitted, UE 1020a may be operable to monitor a channel (e.g., PDCCH) of all subframes n-WS, n-WS+1, . . . , n−1 for cross subframe identifier 1038 (e.g., XSI-RNTI) grants.

If a XSI-RNTI grant is successfully decoded at subframe n-m, the content of said grant may be used to decode a transmission 1032 from eNB 1010b including a data channel (e.g., PDSCH) which carries payload 1040 (subframe n in this example).

Similarly, for paging, a new identity cross subframe paging radio network temporary identifier (XP-RNTI) may be introduced. In such an aspect, a cross-subframe PDCCH grant with a XP-RNTI may be transmitted before paging occasions even if subframe is marked as non-available (N). In one aspect, UE 1020a may be operable to try to decode broadcast channel scheduling information with a received SI-RNTI on subframes used for the payload transmission. In such an aspect, if decoded correctly, the received scheduling information may supersede hard-coded information.

For example, frequency resource and modulation and coding schemes (MCS) used for a payload may be hard-coded and known to UE 1020a. Further, frequency resource may depend on cell identity or power class. In one aspect, hard-coded default channel settings may be defined based on a power class and cell identity for the first eNB. For example, a macro eNB power class may have different settings, than a femto eNB power class, which may include different settings than a pico eNB power class. As such, UE 1020a may use this a-priori information for the decoding of data channel of subframes carrying the payload, without the need for corresponding control channel decoding with a control channel identifier.

III. Double Transmission of SIB1

Figure 11:
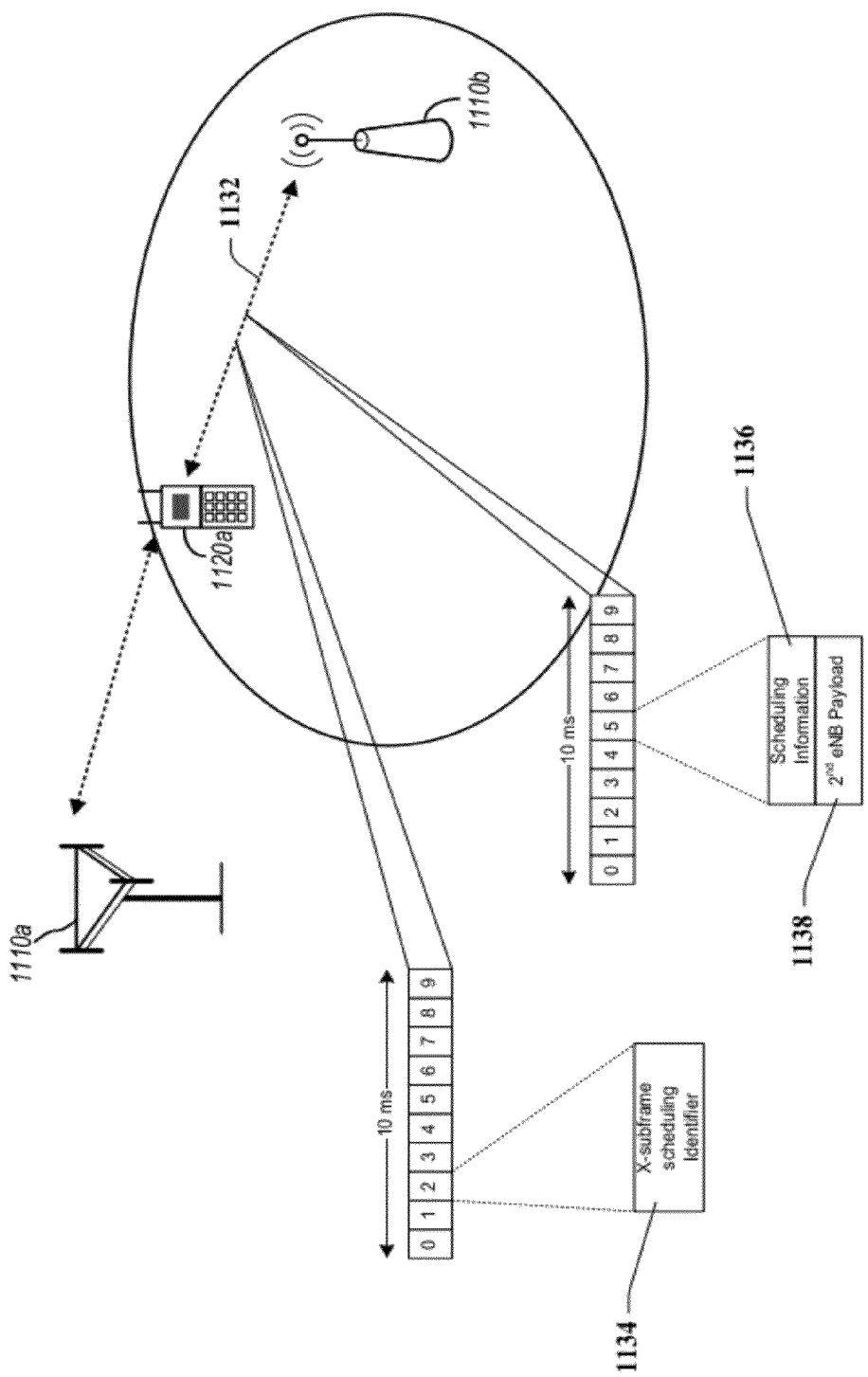
FIG. 11 is yet another diagram illustrating an example interference coordination scheme in an access network.

FIG. 11 illustrates still another wireless communications system in which an aggressor eNB 1110a may interfere with communications between a victim eNB 1110b and UE 1120a. In one aspect, a UE 1120a may be operable to try to decode a payload 1138 (e.g., PDCCH payload) with broadcast channel scheduling information 1136 (e.g., system information radio network temporary identifier (SI-RNTI)) in subframe n. Additionally, a cross subframe scheduling identifier 1134 (e.g., XSI-RNTI) may be received prior to reception of broadcast channel scheduling information 1136 in subframe n.

If both XSI-RNTI 1134 and SI-RNTI 1136 grants are relevant to the same payload 1138 transmission and both are decoded correctly, UE 1120a may compare their content. If the XSI-RNTI and SI-RNTI grants are different, UE 1120a may choose one of them at random, choose one based on some metric (e.g., likelihood metric), skip to the next SIB1 opportunity, try to soft-combine them, etc. The selected/combined content may then be used to decode the payload in subframe n. If XSI-RNTI grant is not received correctly in the above mentioned window, UE 1120a may monitor PDCCH of subframe n for a SI-RNTI grant.

In other words, eNB 1110b may transmit 1132 broadcast channel scheduling information 1134 and a payload 1138 (e.g., SIB1) twice, first in subframe 5 of even radio frames (for legacy UEs) and, second in another second location 1136 (for advanced UEs). The second location may include a protected (U) subframe. For example, a payload may be transmitted in U subframes with a periodicity that is close to 20 ms (in order to reduce excessive overhead usage due to payload transmission). For 8 ms TDM partitions, a second payload may be sent using a U subframe with a 16 ms SIB1 periodicity. The payload scheduling may be determined based on the Static Resource Partitioning Information (SRPI). A payload may be sent in subframe n if:

$$SRPI[n \% 8] = U,$$

$$SRPI[0,1,\ldots,n \% 8-1] \neq U, \text{ and}$$

$$\text{floor}((n \% 80)/8) \text{mode } 2 = 0.$$

In one aspect, SRPI may have values of U for a protected subframe, N for non-usable subframes, and X for other subframes.

In another aspect, interference coordination module 930 may be operable to transmit various system information block types during protected subframes. For example, eNB may want to schedule transmission of system information blocks in protected subframes, with a periodicity greater than 8 subframes.

In an aspect, communication in a dominant interference scenario may be supported by one or more interference coordination schemes, such as broadcast channel interference coordination schemes. Various apparatuses and methods associated with the above described interference coordination schemes are provided with reference to FIGS. 9 through 21.

Figure 12:
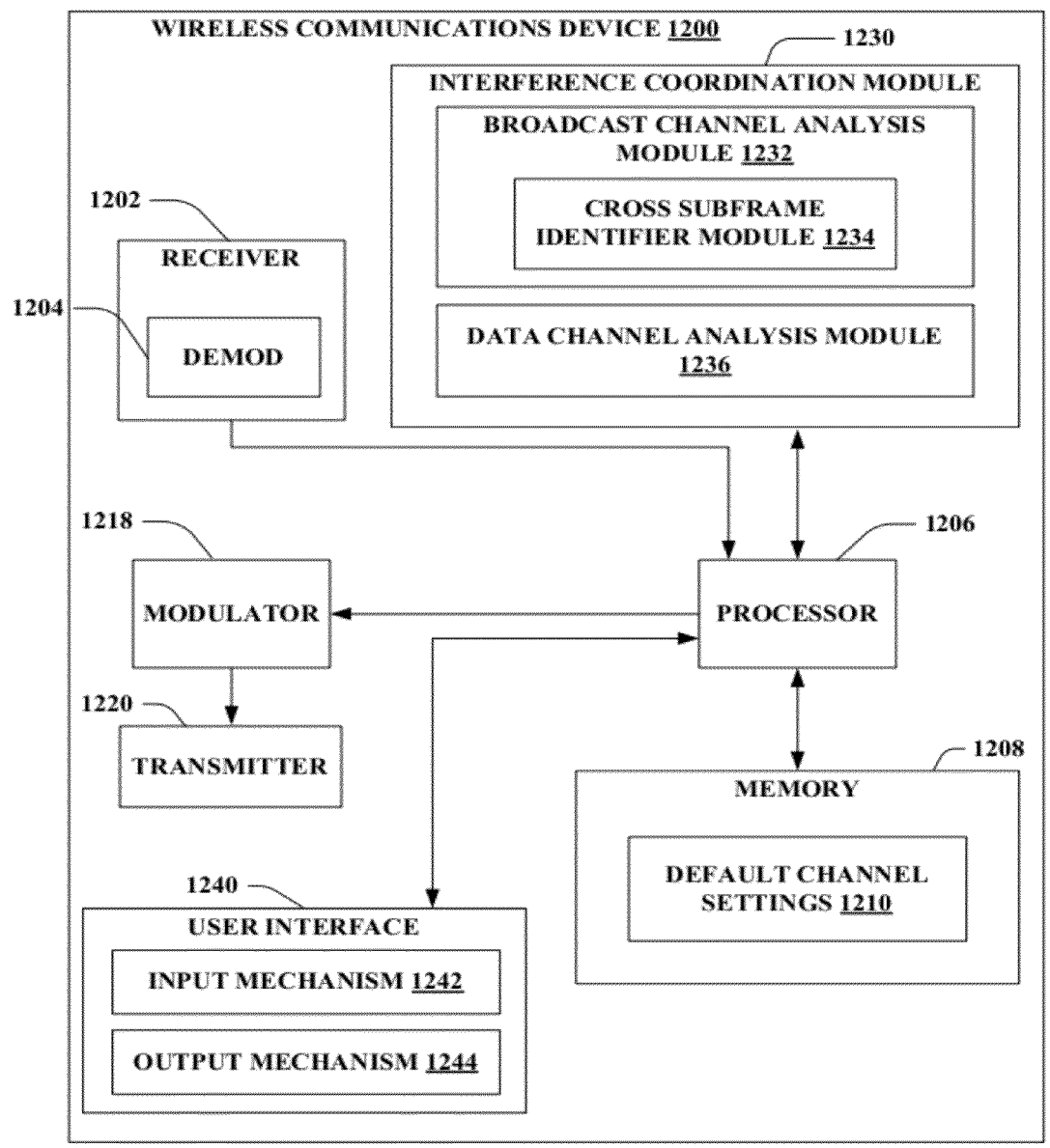
FIG. 12 is an example multiple access wireless communication system according to an aspect.

In FIG. 12, additional description for a user equipment (UE), such a UE 650, according to an aspect is illustrated. UE 1200 may include a receiver 1202 that receives a signal from, for instance, a receive antenna (not shown), performs typical actions on (e.g., filters, amplifies, downconverts, etc.) the received signal, and digitizes the conditioned signal to obtain samples. Receiver 1202 can include a demodulator 1204 that can demodulate received symbols and provide them to processor 1206 for channel estimation. Processor 1206 can be a processor dedicated to analyzing information received by receiver 1202 and/or generating information for transmission by transmitter 1220, a processor that controls one or more components of UE 1200, and/or a processor that both analyzes information received by receiver 1202, generates information for transmission by transmitter 1220, and controls one or more components of UE 1200.

UE 1200 can additionally include memory 1208 that is operatively coupled to processor 1206 and that can store data to be transmitted, received data, information related to available channels, data associated with analyzed signal and/or interference strength, information related to an assigned channel, power, rate, or the like, and any other suitable information for estimating a channel and communicating via the channel. Memory 1208 can additionally store protocols and/or algorithms associated with estimating and/or utilizing a channel (e.g., performance based, capacity based, etc.). In one aspect, memory 1208 can include default channel settings 1210, as discussed with reference to FIG. 10.

Further, processor 1206 can provide means for determining broadcast channel scheduling information for one or more broadcasts of a payload by a broadcast channel associated with a first base station (e.g., eNB) based on one or more broadcast channel interference coordination schemes. In one aspect, reception of the broadcast channel associated with the first base station is interfered at least in part based on one or more transmissions from a second base station. Process 1206 can further provide means for receiving the payload based on the determined broadcast channel scheduling information.

It will be appreciated that data store (e.g., memory 1208) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Memory 1208 of the subject systems and methods may include, without being limited to, these and any other suitable types of memory.

UE 1200 can further include interference coordination module 1230 to facilitate communications in a high interference environment. In one aspect, interference coordination module 1230 may be operable during high interference conditions (e.g., such as depicted in FIG. 8). Interference coordination module 1230 may further include broadcast channel analysis module 1232 to assist in obtaining and processing broadcast channel information from a first eNB (e.g., macro eNB, pico eNB, etc.) when a second eNB (e.g., femto eNB, macro eNB, etc.) is interfering with signal reception.

In one aspect, broadcast channel analysis module 1232 may include cross subframe identifier module 1234. In one aspect, a first instance of broadcast channel scheduling information may be used to reference a payload that may be received during a later subframe. In such an aspect, the first instance may be referred to as a cross subframe identifier. Cross subframe identifier module 1234 may be operable to monitor for a cross subframe identifier.

Interference coordination module 1230 may further include data channel analysis module 1236 to facilitate accessing a transmitted payload from a first eNB while the UE is in the presence of a second eNB causing interference. In one aspect, various payloads communicated in the data channel resources may be orthogonally allocated. In such an aspect, an interfering eNB may not transmit on resource blocks (RBs) assigned for payload transmission from the first eNB.

In one aspect, as discussed with reference to FIG. 10, eNB may negotiate over the backhaul to determine payload resource allocation. In another aspect, resource allocation may depend on the power class of the eNB and may be hard coded. For example, as depicted in FIG. 10, resource allocation for eNBs 1010a and 1010b may be defined based on their power classes, macro and pico, respectively, and UE 1020a may be hardcoded to receive different signals from different power class eNBs. In one such aspect, the hard-coded information may be stored in UE 1200 memory 1208 with the default channel settings 1210.

Additionally, UE 1200 may include user interface 1240. User interface 1240 may include input mechanisms 1242 for generating inputs into communications device 1200, and output mechanism 1242 for generating information for consumption by the user of UE 1200. For example, input mechanism 1242 may include a mechanism such as a key or keyboard, a mouse, a touch-screen display, a microphone, etc. Further, for example, output mechanism 1244 may include a display, an audio speaker, a haptic feedback mechanism, a Personal Area Network (PAN) transceiver etc. In the illustrated aspects, output mechanism 1244 may include a display operable to present media content that is in image or video format or an audio speaker to present media content that is in an audio format.

Figure 13:
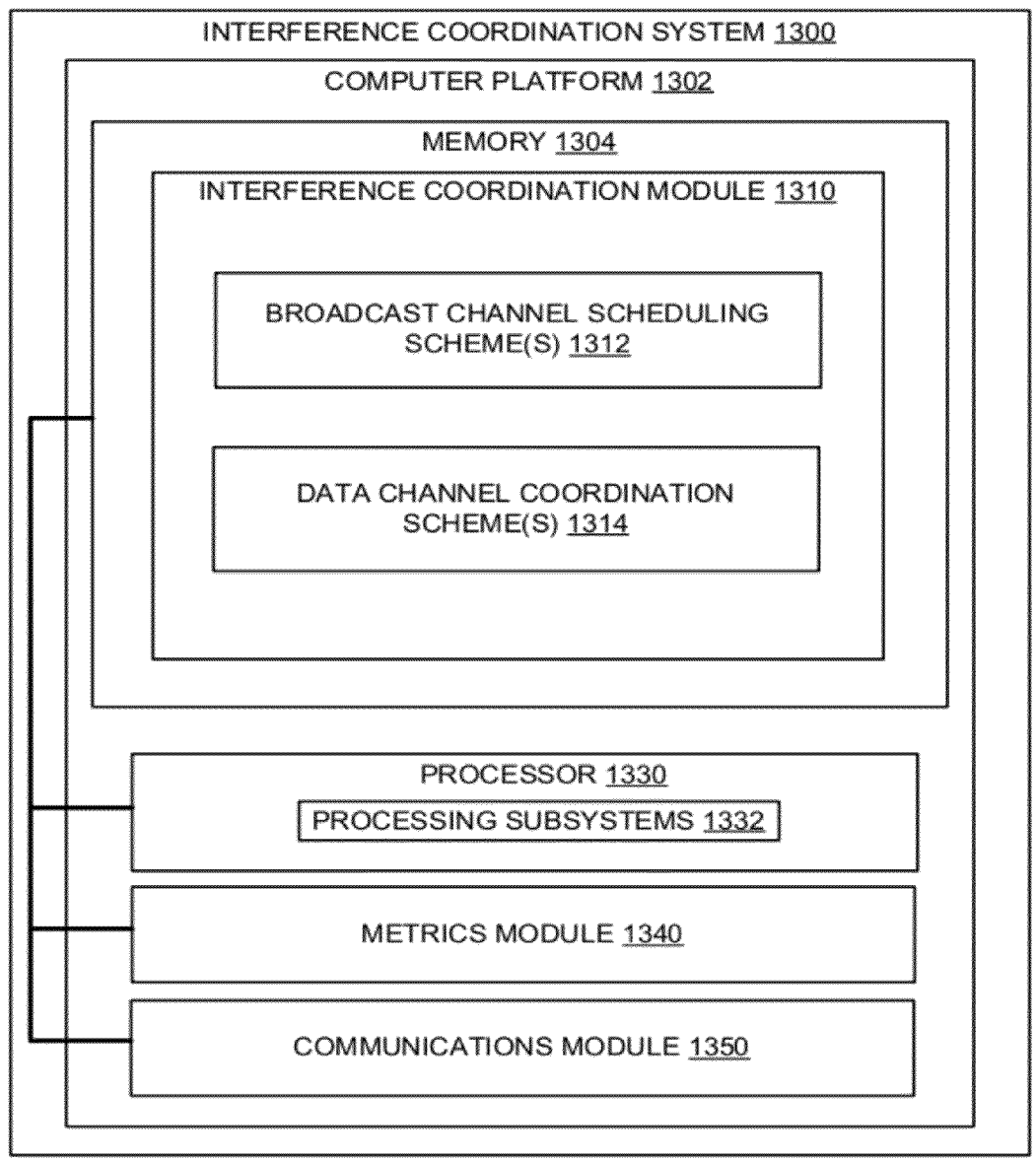
FIG. 13 is a block diagram of an example communication system.

With reference to FIG. 13, illustrated is a detailed block diagram of interference coordination system 1300, such as eNB 204 depicted in FIG. 2. Interference coordination system 1300 may include at least one of any type of hardware, server, personal computer, mini computer, mainframe computer, or any computing device either special purpose or general computing device. Further, the modules and applications described herein as being operated on or executed by interference coordination system 1300 may be executed entirely on a single network device, as shown in FIG. 2, or alternatively, in other aspects, separate servers, databases or computer devices may work in concert to provide data in usable formats to parties, and/or to provide a separate layer of control in the data flow between communications devices 206 and the modules and applications executed by interference coordination system 1300.

Interference coordination system 1300 includes computer platform 1302 that can transmit and receive data across wired and wireless networks, and that can execute routines and applications. Computer platform 1302 includes memory 1304, which may include volatile and nonvolatile memory such as read-only and/or random-access memory (ROM and RAM), EPROM, EEPROM, flash cards, or any memory common to computer platforms. Further, memory 1304 may include one or more flash memory cells, or may be any secondary or tertiary storage device, such as magnetic media, optical media, tape, or soft or hard disk. Further, computer platform 1302 also includes processor 1330, which may be an application-specific integrated circuit ("ASIC"), or other chipset, logic circuit, or other data processing device. Processor 1330 may include various processing subsystems 1332 embodied in hardware, firmware, software, and combinations thereof, that enable the functionality of interference coordination system 1300 and the operability of the system on a wired or wireless network.

In one aspect, processor 1330 may provide means for communicating broadcast channel scheduling information for a payload associated with a first base station based on one or more broadcast channel interference coordination schemes. In one aspect, interference from a second base station interferes with reception of the broadcast channel scheduling information broadcast by the first base station. Processor 1330 may also provide means for transmitting the payload based on the one or more broadcast channel interference schemes.

Computer platform 1302 further includes communications module 1350 embodied in hardware, firmware, software, and combinations thereof, that enables communications among the various components of service provider system 1300, as well as between service provider system 1300, devices 206, and eNBs 204. Communication module 1350 may include the requisite hardware, firmware, software and/or combinations thereof for establishing a wireless communication connection. According to described aspects, communication module 1350 may include the necessary hardware, firmware and/or software to facilitate wireless broadcast, multicast and/or unicast communication of requested content items, control information, etc.

Computer platform 1302 further includes metrics module 1340 embodied in hardware, firmware, software, and combinations thereof, that enables metrics received from device 206, eNB 204, etc., corresponding to, among other things, interference levels for data communicated with devices 206. In one aspect, interference coordination system 1300 may analyze data received through metrics module 1340 to modify possible interference coordination schemes for future communications with device 206.

Memory 1304 of interference coordination system 1300 includes interference coordination module 1310 operable to facilitate communications with a UE in high interference environments. In one aspect, interference coordination module 1310 may include broadcast channel scheduling schemes 1312 and data channel coordination schemes 1314. In one aspect, broadcast channel scheduling schemes 1312 may include using an interfering eNB to broadcast payload scheduling information for an eNB experiencing interference. In another aspect, broadcast channel scheduling schemes 1312 may include providing a scheduling grant in a previous (clean) subframe for a payload. In other words, the scheduling grant may point to a payload of a different subframe (e.g., cross subframe scheduling). Further, if the interfered with eNB (e.g., victim node) transmits cross-subframe grant in a protected subframe, e.g., where aggressor node(s) do not transmit their control channel information, cross-subframe grant may be decoded correctly. Existing legacy UEs may ignore cross-subframe grants, and may still try to decode control channel scheduling information for a payload on the subframe that corresponds to the payload.

In one aspect, data control coordination schemes 1314 may include orthogonally allocating resources. In other words, data channel resources may be orthogonally allocated. In such an aspect, an interfering eNB may not transmit on resource blocks (RBs) assigned for payload transmission from the first eNB. In one aspect, over-the-backhaul negotiations among eNBs of frequency resources may be used for payload RB allocation. In another aspect, resource allocation may depend on power class of the eNB and may be hard coded.

In one aspect, interference coordination module 1310 may be operable to transmit data during subframes in which the about described payload is to be transmitted. In one aspect, an aggressor eNB (e.g., femto) may not transmit data in RBs where victim eNB is transmitting the payload. By contrast, a victim eNB (e.g., macro) may or may not transmit data in RBs where an aggressor is transmitting SIB1. For example, data transmission may only occur to UEs not under the femto coverage area.

In another aspect, even with frequency resource orthogonalization, scheduling information may still be jammed on subframes used for payload delivery. In such an aspect, interference coordination module 1310 may be operable to enable the victim eNB to refrain transmitting any data, to transmit data only to UEs not in aggressor's coverage, to transmit data to any UE, to facilitate allocation of scheduling information transmissions among different power class, to prompt a UE to perform interference cancellation, etc.

In still another aspect, if a subframe n is used for payload (e.g., SIB1) delivery, and a UE attempting to communicate with a victim eNB is scheduled for uplink (e.g., physical uplink shared channel (PUSCH)) transmission in subframe n−4, an ACK/NACK transmitted in PHICH of subframe n may be jammed. In such an aspect, interference coordination module 1310 may allow victim eNB to refrain from scheduling any UL transmission in subframe n−4 (overhead), to schedule UL data in subframe n−4 only from UEs not in aggressor's coverage, to facilitate allocation of transmissions among different power class, to prompt a UE to perform interference cancellation, etc.

Figure 14:
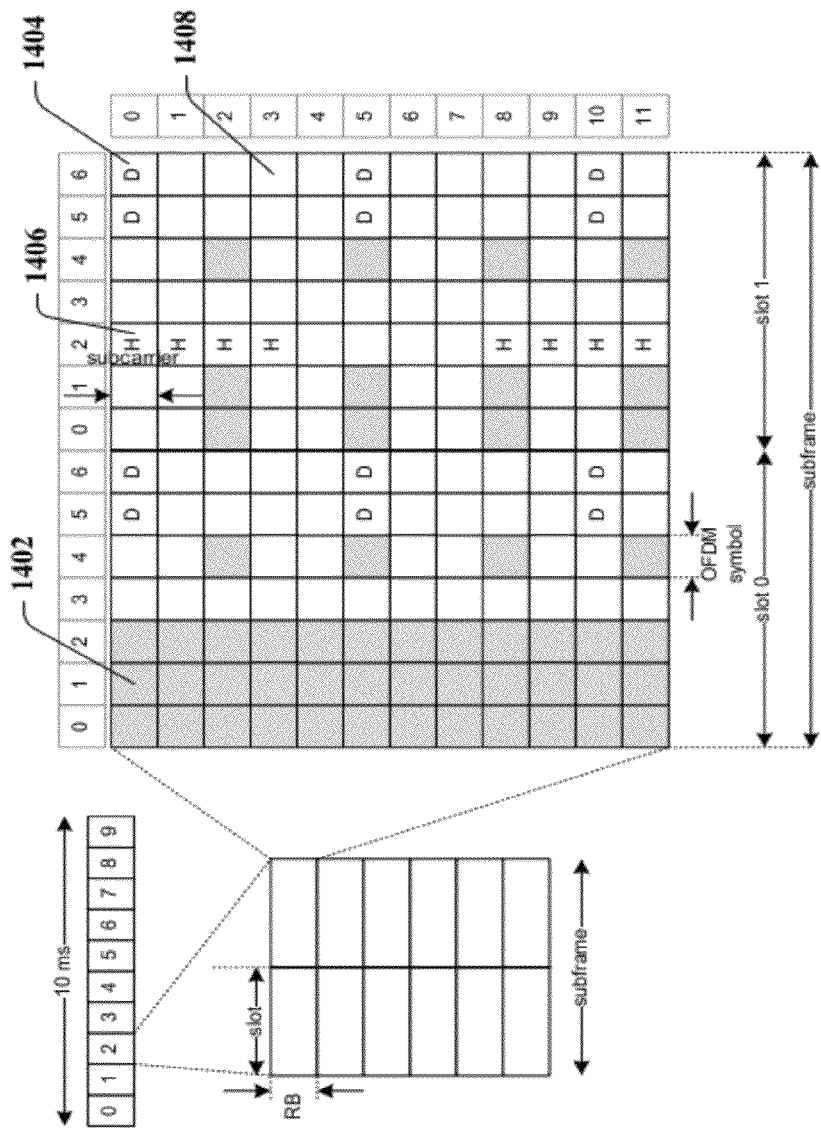
FIG. 14 is a conceptual diagram of an example frame structure according to an aspect.

FIG. 14 illustrates an example of a DL frame structure. However, as those skilled in the art will readily appreciate, the frame structure for any particular application may be different depending on any number of factors. In this example, a frame (10 ms) is divided into 10 equally sized sub-frames. Each sub-frame includes two consecutive time slots. A resource grid may be used to represent two time slots, each two time slots including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. The number of bits carried by each resource element depends on the modulation scheme. Thus, the more resource blocks that a UE receives and the higher the modulation scheme, the higher the data rate for the UE.

In one aspect, control channel information may be transmitted through a data channel. For example, as described in FIG. 14, a relay physical data control channel (R-PDCCH) (1408) based approach may be used. In one aspect, a DL frame may include unused RSs (1402), RSs used to communicate DM-RS (1404), RSs used to communicate PHICH (1406), and RSs used to communicate PDCCH and/or R-PDCCH (1408). Generally, a R-PDCCH (1408) may be used to allow decoding of a PDCCH (1408) even in the presence of interference. Further, in one aspect, a PDCCH may be embedded inside the PDSCH region. In such an aspect, the PDCCH may be embedded using orthogonalization between a victim eNB and an aggressor eNB. Still further, in such an aspect, even if a first instance of OFDM symbols (carrying legacy PDCCH) are jammed, a receiver may decode a second instance of the OFDM symbols transmitted using the R-PDCCH on a protected resource. In one such example, the R-PDCCH carries the same content of the corresponding PDCCH.

Furthermore, R-PDCCH may be used to help SIB1 delivery and paging. For example, besides the SI-RNTI based grant in PDCCH, a duplicate grant may be added inside the R-PDCCH of the same subframe. In such an aspect, a Rel-10 UE may attempt to decode the PDCCH. If the attempt fails, the Rel-10 UE may try to decode a duplicate SI-RNTI grant added to the R-PDCCH. In one aspect, negotiations of protected resources may occur between aggressor and victim nodes, not only for data payload (PDSCH) but for grant information (e.g., R-PDCCH resources).

In another aspect, a Multi-Media Broadcast over a Single Frequency Network (MBSFN) subframe may be used for protection of the SIB1/paging subframes used by aggressor. In one such aspect, a control information subframe occasion used by victim eNB may be timed to coincide with an aggressor eNB MBSFN subframe. In one aspect, the PDSCH region may be cleared, thus both R-PDCCH and a corresponding payload may be decoded. One advantage of such an aspect, is that it may not use FDM resource orthogonalization (and corresponding negotiations) between victim and aggressor eNBs.

FIGS. 15 to 21 illustrate various methodologies in accordance with the claimed subject matter. While, for purposes of simplicity of explanation, the methodologies are shown and described as a series of acts, it is to be understood and appreciated that the claimed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the claimed subject matter. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Figure 15:
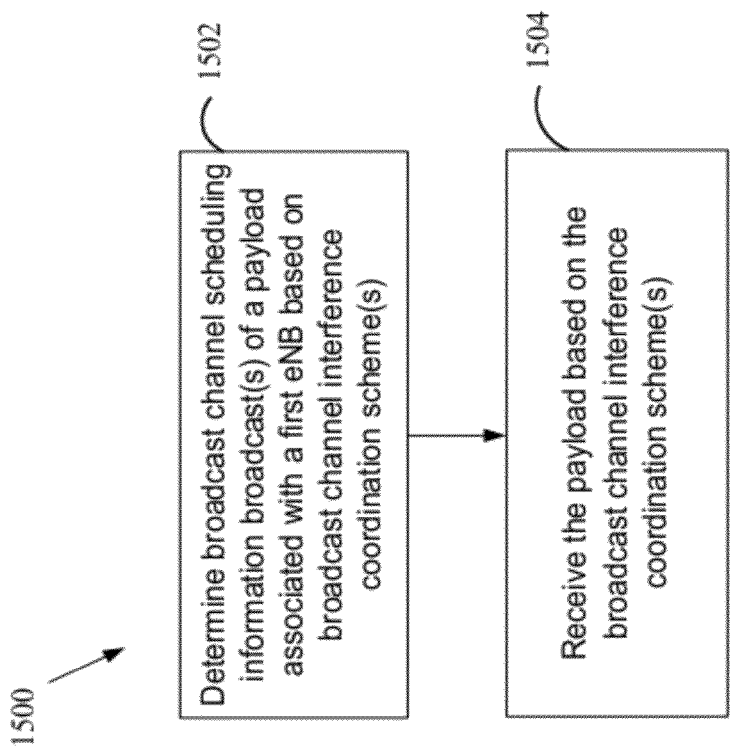
FIG. 15 is a flow chart of a method of wireless communication.

FIG. 15 is a flow chart 1500 of a method of wireless communication. The method includes determining broadcast channel scheduling information for one or more broadcasts of a payload by a broadcast channel associated with a first eNB based on one or more broadcast channel interference coordination schemes (1502). Reception of the broadcast channel associated with the first eNB is interfered with at least in part based on one or more transmissions from a second eNB. In one aspect, one of the one or more broadcast channel interference coordination schemes may include receiving the broadcast channel scheduling information from a broadcast by the second eNB. In such an aspect, the broadcast from the second eNB includes broadcast information for the second eNB and the broadcast channel scheduling information associated with the first eNB. The second eNB obtains the broadcast channel scheduling information from the first eNB over a back-haul network connection. Various broadcast channel interference coordination schemes are discussed further with reference to FIGS. 17, 18 and 19.

In addition, the method further includes receiving the payload based on the determined broadcast channel scheduling information (1504). In one aspect, the payload associated with the first eNB is broadcast based on default scheduling information that may be hard coded into a UE. In such an aspect, the default scheduling information may depend on: a power class of the first ENB, a cell identity for the first eNB, etc. In one aspect, a payload may include: paging message, SIB1, SIB2, SIB3, SIB4, SIB5, etc. In another aspect, the receiving may include receiving the payload associated with first eNB during a first subframe. In such an aspect, a payload associated with the second eNB may be transmitted by the second eNB during the first subframe, and the payload associated with first eNB and the payload associated with the second eNB are allocated to separate frequency resources. In such an aspect, the separate frequency resources may be allocated either statically, or negotiated between the first eNB and second eNB over a back-haul network connection. In one aspect, a received power for the first eNB may be less than a received power for the second eNB. In one aspect, the first eNB may be a pico cell and the second eNB may be a macro cell. In one aspect, the first eNB may be a macro cell and the second eNB may be a femto cell.

Figure 16:
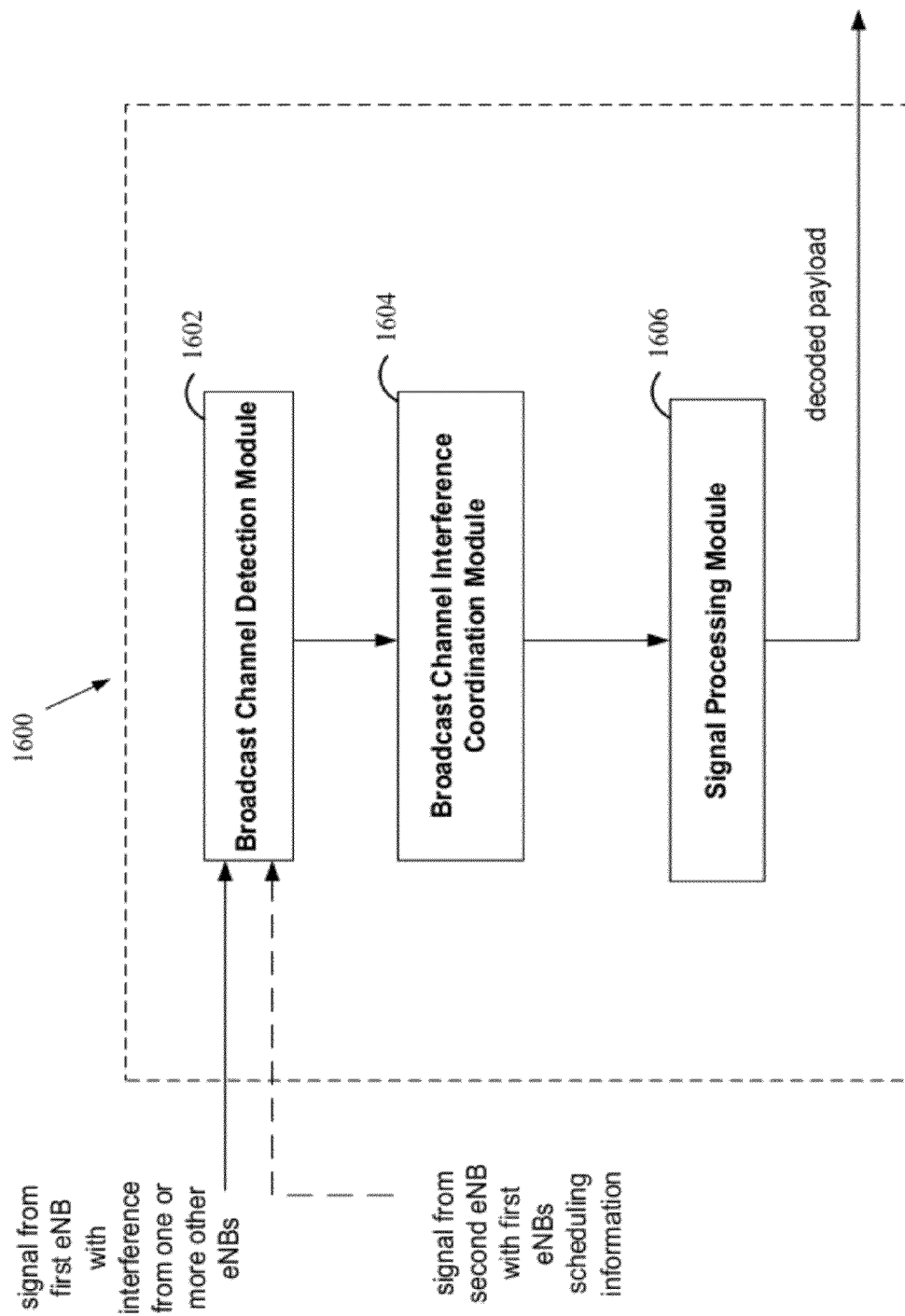
FIG. 16 is a conceptual block diagram illustrating the functionality of an example apparatus.

FIG. 16 is a conceptual block diagram 1600 illustrating the functionality of an example apparatus 102. Apparatus 102, which may be a UE, includes a broadcast channel reception module 1602 that detects signals from a plurality of eNBs. Broadcast channel reception module 1602 detects signals from a plurality of eNBs. Broadcast channel interference coordination module 1604 interprets the received signal and determines which of one or more broadcast interference coordination schemes may be used to access broadcast channel scheduling information for a first (e.g., victim eNB). The signal from the serving eNB includes interference from one or more neighboring cells. In one aspect, broadcast channel reception module 1602 may receive a signal from a second eNB including broadcast channel scheduling information for a first eNB. Broadcast channel interference coordination module 1604 determines the applicable broadcast interference coordination scheme, and communicates the scheme and signals received from one or more eNBs to signal processing module 1606. Signal processing module 1606 may process the one or more signals using information from the broadcast interference coordination scheme to decode a payload from the first (e.g., victim) eNB. Apparatus 102 may include additional modules that perform each of the steps in the flow charts FIGS. 15 and 17-19. As such, each step in the flow charts FIGS. 15 and 17-19 may be performed by a module and apparatus 102 may include one or more of those modules.

Figure 17:
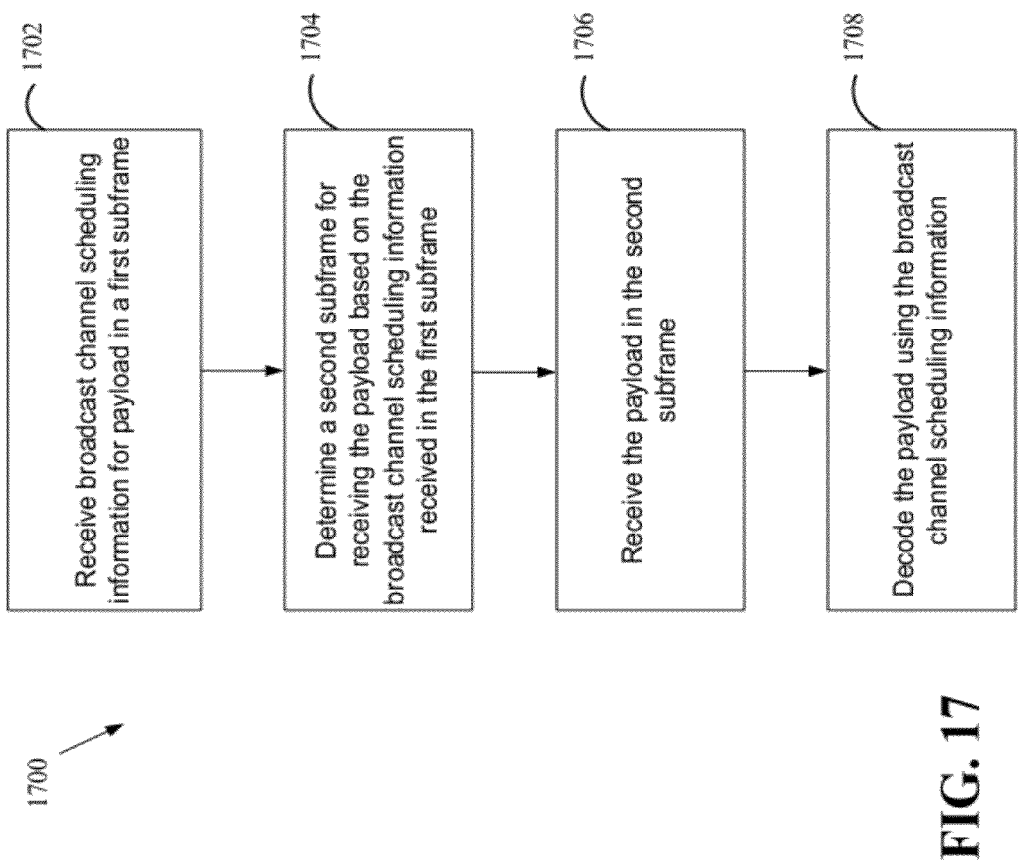
FIG. 17 is a flow chart of a method to implement an inference coordination scheme.

FIG. 17 is a flow chart 1700 of a method of wireless communication. The method includes receiving broadcast channel scheduling information for the payload in a first subframe (1702). The method also includes determining a second subframe for receiving the payload based on the broadcast channel scheduling information received in the first subframe (1704). In such an aspect, the first subframe occurs within a defined window of subframes before the second subframe, and the defined window may include at least one protected subframe. Additionally, the method may include receiving the payload in the second subframe (1706). Moreover, the method may include decoding the payload using the broadcast channel scheduling information (1708).

Figure 18:
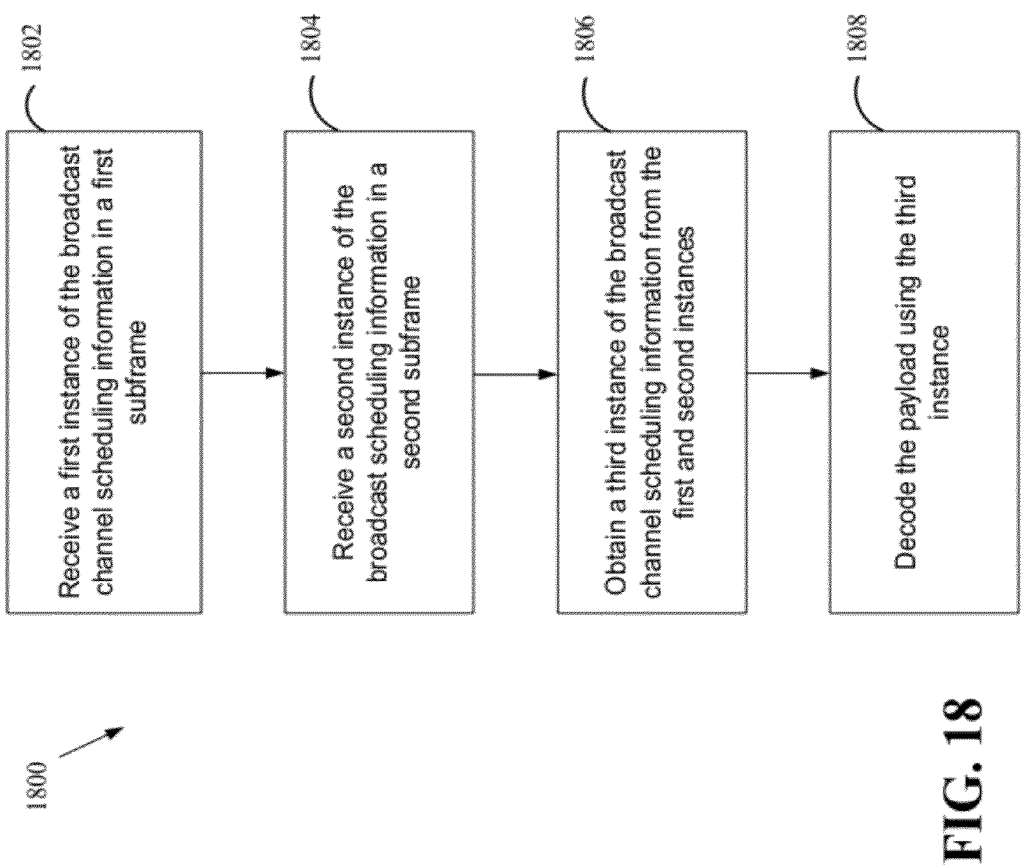
FIG. 18 is another flow chart of a method to implement an inference coordination scheme.

FIG. 18 is a flow chart 1800 of a method of wireless communication. The method includes receiving a first instance of the broadcast channel scheduling information in a first subframe (1802). The method further includes receiving a second instance of the broadcast scheduling information in a second subframe (1804). The method further includes determining that the first instance and the second instance of the broadcast scheduling information are different, and obtaining a third instance of the broadcast channel scheduling information (1806). In such an aspect, the third instance may be obtained by selecting either the first broadcast channel scheduling information or the second instance of the broadcast and ignoring the non-selected instance. The third instance may be obtained by applying a likelihood metric to both the first instance and the second instance of the broadcast scheduling information to determine the more likely instance. Further, the third instance may be obtained by soft-combining the first instance and the second instance of the broadcast scheduling information to generate the third instance, etc. The method further includes decoding a payload using the third instance (1808).

Figure 19:
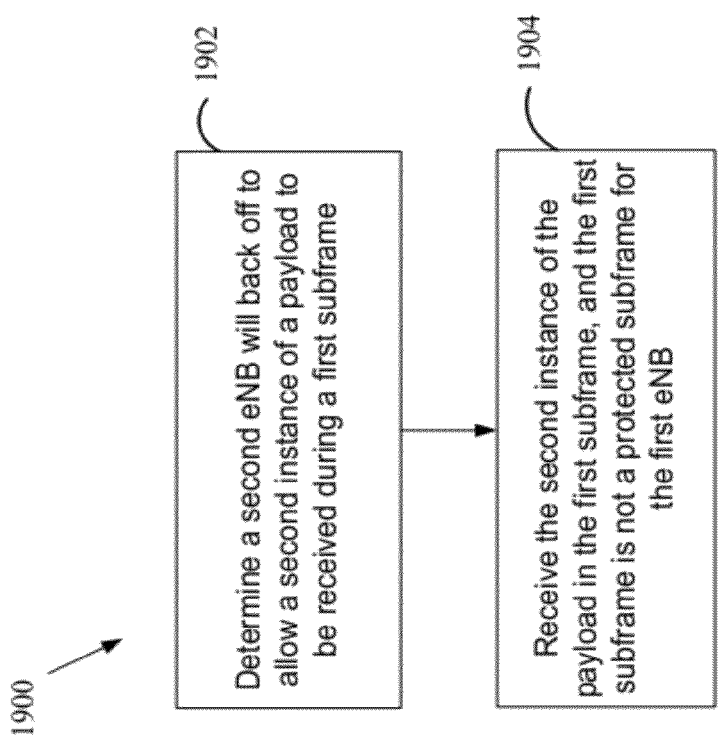
FIG. 19 is yet another flow chart of a method to implement an inference coordination scheme.

FIG. 19 is a flow chart 1900 of a method of wireless communication. The method includes determining a second eNB will back off to allow a second instance of a payload to be received during a first subframe (1902). In such an aspect, the back-off is configured for one or more subframes used by the first eNB to broadcast the second instance of the payload. Further, in such an aspect, the back-off may be configured for reducing transmission power by the second eNB, avoiding transmissions by the second eNB on one or more subframes used by the first eNB to transmit the second instance of the payload, etc. In such an aspect, broadcast scheduling information may be specifically tailored to paging in connected mode. For example, victim eNB may sometimes need to page on "N" subframes. As noted earlier, N subframes are in principle forbidden, and may be affected by strong interference. Even with FDM partitioning of the PDSCH region, UE may not be able to decode the corresponding PDCCH grant. In one such aspect, an aggressor may transmit pages of a victim node, so that UEs associated with the victim node are able to transparently decode them. In another aspect, victim node may communicate with aggressor node to backoff on specific paging occasions that lie on U subframes of aggressor, which victim is going to use. Even if the subframe is a N subframe for victim, the victim node may be dynamically cleared by the aggressor node (e.g., one-shot dynamic U subframe). Further, the aggressor node may not use this subframe (even if it is U for the aggressor node) for data or for control when the backoff request as been approved. The method further includes receiving the second instance of the payload in a first subframe (1904). In one aspect, the first subframe is not a protected subframe for the first eNB.

In another aspect, one of the one or more broadcast channel interference coordination schemes may include receiving a second instance of the broadcast channel scheduling information using a data channel. In such an aspect, broadcast channel scheduling information may be embedded in the PDSCH orthogonally distinct from content being transmitted by the second eNB. Further, in such an aspect, the data channel may include a PDSCH, and the second instance of the broadcast channel scheduling information may be embedded in the PDSCH in a location. The broadcast channel scheduling information is orthogonally distinct from content being transmitted by the second eNB. Still further, in such an aspect, the location for the second instance of the broadcast channel scheduling information may be negotiated between the first and second eNBs. In such an aspect, the second instance of the broadcast channel scheduling information may be embedded in a MBSFN subframe for the first eNB. Further, in such an aspect, the MBSFN subframe for the first eNB may be aligned with a MBSFN subframe for the second eNB.

Figure 20:
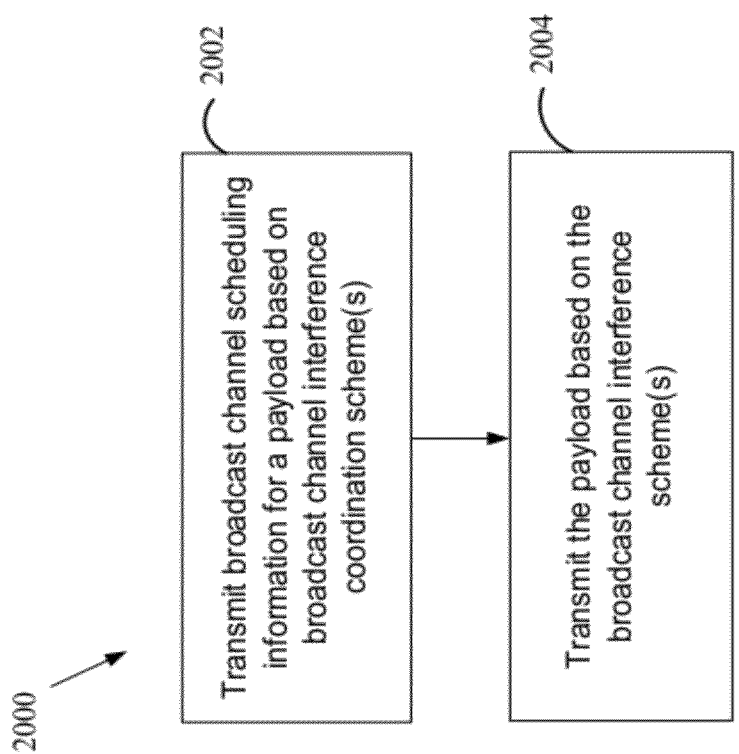
FIG. 20 is a flow chart of another method of wireless communication.

FIG. 20 is a flow chart 2000 of a method of wireless communication. The method may include transmitting, by a first eNB, broadcast channel scheduling information for a payload associated with the first eNB based on one or more broadcast channel interference coordination schemes (2002). In one aspect, interference from a second eNB interferes with reception of the broadcast channel scheduling information broadcast by the first eNB. In addition, the method may include transmitting the payload based on the one or more broadcast channel interference schemes (2004). In one aspect, the payload associated with the first eNB is broadcast based on default scheduling information that may be hard coded into a UE. In such an aspect, the default scheduling information may depend on: a power class of the first ENB, a cell identity for the first eNB, etc. In one aspect, a payload may include: paging message, SIB1, SIB2, SIB3, SIB4, SIB5, etc. In another aspect, the receiving may include receiving the payload associated with first eNB during a first subframe. In such an aspect, a payload associated with the second eNB may be transmitted by the second eNB during the first subframe, and the payload associated with first eNB and the payload associated with the second eNB are allocated to separate frequency resources. In such an aspect, the separate frequency resources may be allocated either statically, or negotiated between the first eNB and second eNB over a back-haul network connection. In one aspect, a received power for the first eNB may be less than a received power for the second eNB. In one aspect, the first eNB may be a pico cell and the second eNB may be a macro cell. In one aspect, the first eNB may be a macro cell and the second eNB may be a femto cell.

Figure 21:
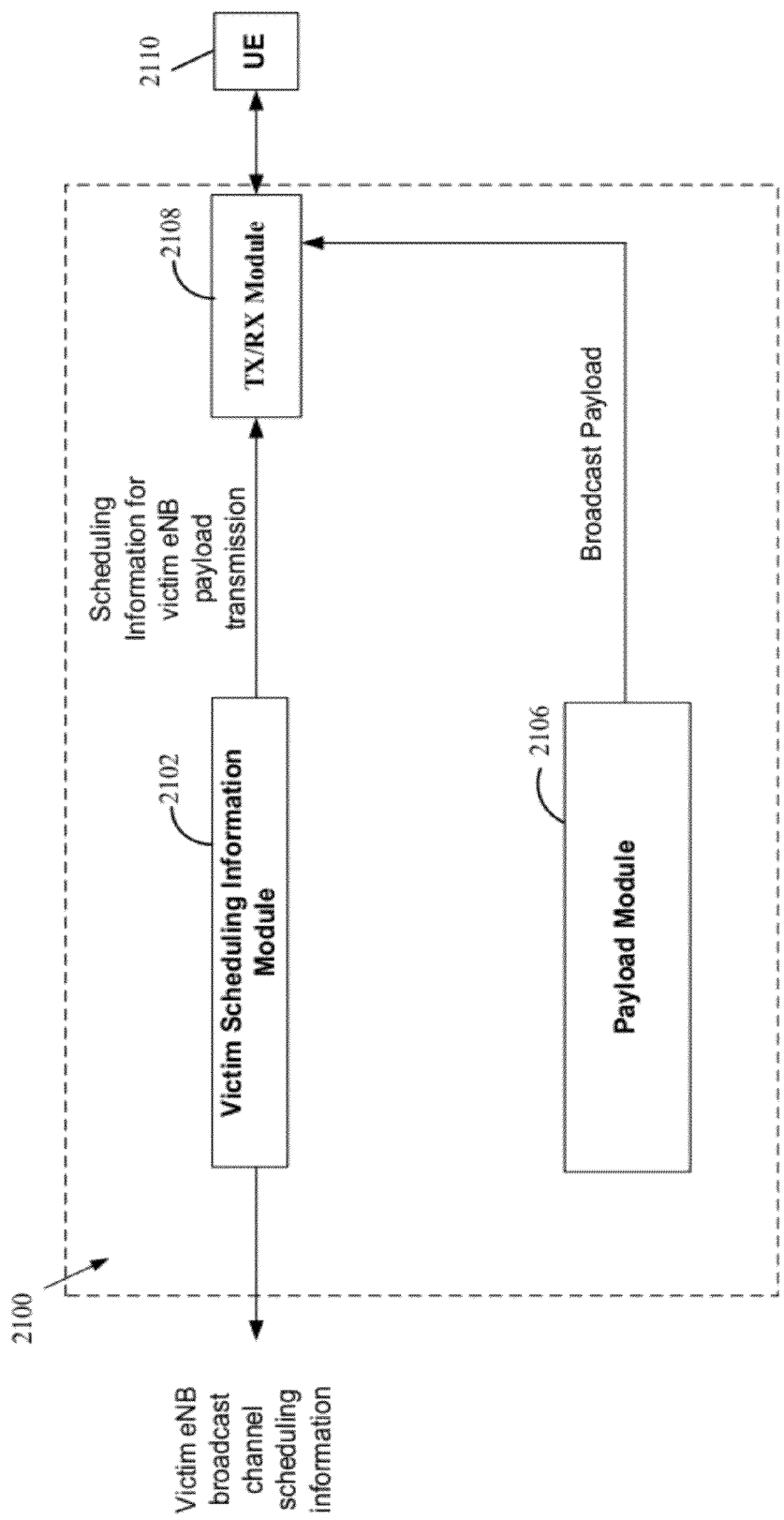
FIG. 21 is a conceptual block diagram illustrating the functionality of another example apparatus.

FIG. 21 is a conceptual block diagram 2100 illustrating the functionality of an example apparatus 104. Apparatus 104, which may be an eNB, includes victim eNB scheduling information module 2102 that transmits broadcast scheduling information for a first (e.g., victim) eNB to a second (e.g., aggressor) eNB. In one aspect, the victim eNB scheduling information module 2102 may communicate the broadcast scheduling information over a back-haul connection with the aggressor eNB. In one aspect, the victim eNB scheduling information may be determined based on one or more broadcast channel interference schemes. Tx/Rx module 2108 obtains the victim broadcast channel scheduling information with the victim eNB payload, obtained from victim eNB scheduling information module 2102 and payload module 2106, respectively. Thereafter, Tx/Rx module 2108 transmits at least the victim payload. In one aspect, timing and content to the transmission by Tx/Rx module 2108 may be determined at least in part based on the one or more broadcast channel interference schemes.

Referring to FIG. 1 and FIG. 6, in one configuration, apparatus 104 for wireless communication includes means for transmitting, by the first eNB, broadcast channel scheduling information for a payload associated with the first eNB based on one or more broadcast channel interference coordination schemes, wherein interference from a second eNB interferes with reception of the broadcast channel scheduling information broadcast by the first eNB, and means for transmitting the payload based on the one or more broadcast channel interference schemes. Apparatus 104 may further include means for transmitting the broadcast channel scheduling information to the second eNB over a back-haul connection. In such an aspect, a broadcast from the second eNB includes broadcast information for the second eNB and the broadcast channel scheduling information associated with the first eNB. Apparatus 104 may further include means for transmitting the broadcast channel scheduling information for the payload in a first subframe, and means for transmitting the payload in a second subframe based on the broadcast channel scheduling information transmitted in the first subframe. Apparatus 104 may further include means for transmitting a second payload. In such an aspect, the second payload is transmitted in a first subframe, the first subframe is a protected subframe for the first eNB, and the second payload includes at least one of: a SIB2, SIB3, SIB4 or SIB5. Apparatus 104 may further include means for transmitting a second instance of the payload in a first subframe. In one aspect, the first subframe is not a protected subframe for the first eNB, and the second eNB backs off to allow the second instance of the payload to be received. Apparatus 104 may further include means for negotiating the orthogonally distinct location for the second instance of the broadcast channel scheduling information with the second eNB. Apparatus 104 may further include means for transmitting the payload associated with first eNB during a first subframe. In such an aspect, a payload associated with the second eNB is transmitted by the second eNB during the first subframe, and the payload associated with first eNB and the payload associated with the second eNB are allocated to separate frequency resources. The aforementioned means includes TX Processor 616, RX Processor 670, and controller/processor 675.

In another configuration, apparatus 102 for wireless communication includes means for determining broadcast channel scheduling information for one or more broadcasts of a payload by a broadcast channel associated with a first eNB based on one or more broadcast channel interference coordination schemes. Further, reception of the broadcast channel associated with the first eNB is interfered with at least in part based on one or more transmissions from a second eNB. Apparatus 102 for wireless communication includes means for receiving the payload based on the determined broadcast channel scheduling information. Apparatus 102 may further include means for receiving the broadcast channel scheduling information from a broadcast by the second eNB. In such an aspect, the broadcast from the second eNB includes broadcast information for the second eNB and the broadcast channel scheduling information associated with the first eNB, and the second eNB obtains the broadcast channel scheduling information from the first eNB over a back-haul network connection. Apparatus 102 may further include means for receiving the broadcast channel scheduling information for the payload in a first subframe, and means for receiving the payload in a second subframe using the broadcast channel scheduling information received in the first subframe. Apparatus 102 may further include means for receiving a first instance of the broadcast channel scheduling information in a first subframe, means for receiving a second instance of the broadcast scheduling information in a second subframe, means for determining that the first instance and the second instance of the broadcast scheduling information are different, and means for obtaining a third instance of the broadcast channel scheduling information. In such an aspect, the means for obtaining may further include means for selecting either the first broadcast channel scheduling information or the second instance of the broadcast and ignoring the non-selected instance. The means for obtaining may further include means for applying a likelihood metric to both the first instance and the second instance of the broadcast scheduling information to determine the more likely instance. The means for obtaining may further include means for soft-combining the first instance and the second instance of the broadcast scheduling information to generate the third instance. Apparatus 102 may further include means for receiving a second payload. In such an aspect, the second payload is transmitted in a first subframe, the first subframe is a protected subframe for the first eNB, and the second payload includes at least one of: a SIB2, SIB3, SIB4 or SIB5. Apparatus 102 may further include means for receiving a second instance of the payload in a first subframe, the first subframe is not a protected subframe for the first eNB, and the second eNB backs off to allow the second instance of the payload to be received. For apparatus 102, the back-off may be configured for at least one of means for reducing transmission power by the second eNB, or means for avoiding transmissions by the second eNB on one or more subframes used by the first eNB to transmit the second instance of the payload. Apparatus 102 may further include means for receiving the payload associated with first eNB during a first subframe. In such an aspect, a payload associated with the second eNB is transmitted by the second eNB during the first subframe, and the payload associated with first eNB and the payload associated with the second eNB are allocated to separate frequency resources. The aforementioned means includes TX Processor 668, RX Processor 656, and controller/processor 659.

It is understood that the specific order or hierarchy of steps in the processes disclosed is an illustration of exemplary approaches. Based upon design preferences, it is understood that the specific order or hierarchy of steps in the processes may be rearranged. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method of wireless communications, comprising:
   determining broadcast channel scheduling information for one or more broadcasts of a payload by a broadcast channel associated with a first base station based on one or more broadcast channel interference coordination schemes, wherein reception of the broadcast channel associated with the first base station is interfered at least in part based on one or more transmissions from a second base station; and
   receiving the payload based on the determined broadcast channel scheduling information,
   wherein one of the one or more broadcast channel interference coordination schemes comprises receiving the broadcast channel scheduling information in a broadcast by the second base station, wherein the broadcast from the second base station includes broadcast information associated with the second base station and the broadcast channel scheduling information associated with the first base station, the broadcast channel scheduling information associated with the first base station includes a cross subframe scheduling identifier.

2. The method of claim 1, wherein the second base station obtains the broadcast channel scheduling information from the first base station over a back-haul network connection.

3. The method of claim 1, wherein one of the one or more broadcast channel interference coordination schemes comprises:
   receiving the broadcast channel scheduling information for the payload in a first subframe; and
   receiving the payload in a second subframe using the broadcast channel scheduling information received in the first subframe.

4. The method of claim 3, wherein the first subframe occurs before the second subframe, wherein the first subframe is a protected subframe for the first base station, and wherein a user equipment (UE) experiences interference lower than a threshold value from the second base station during the protected subframe.

5. The method of claim 4, wherein the first subframe occurs within a defined window of subframes before the second subframe, and wherein the defined window comprises at least one protected subframe.

6. The method of claim 1, wherein one of the one or more broadcast channel interference coordination schemes comprises:
   receiving a first instance of the broadcast channel scheduling information in a first subframe;
   receiving a second instance of the broadcast scheduling information in a second subframe;
   determining that the first instance and the second instance of the broadcast scheduling information are different; and
   obtaining a third instance of the broadcast channel scheduling information, wherein the third instance is obtained by at least one of:
      selecting either the first instance of the broadcast channel scheduling information or the second instance of the broadcast and ignoring the non-selected instance;
      applying a likelihood metric to both the first instance and the second instance of the broadcast scheduling information to determine the more likely instance; or
      soft-combining the first instance and the second instance of the broadcast scheduling information to generate the third instance.

7. The method of claim 1, wherein the payload associated with the first base station is received based on default broadcast scheduling information, wherein the default broadcast scheduling information is hard coded into a UE.

8. The method of claim 7, wherein the default broadcast scheduling information depends on at least one of a power class or cell identity of the first base station.

9. The method of claim 1, further comprising:
   receiving a second payload, wherein the second payload is transmitted in a first subframe, wherein the first subframe is a protected subframe for the first base station, and wherein the second payload comprises at least one of: a SIB2, SIB3, SIB4 or SIB5.

10. The method of claim 1, wherein one of the one or more broadcast channel interference coordination schemes comprises:
    receiving a second instance of the payload in a first subframe, wherein the first subframe is not a protected subframe for the first base station.

11. The method of claim 10, wherein the second base station backs off to allow the second instance of the payload to be received, and wherein the back-off is configured for one or more subframes used by the first base station to broadcast the second instance of the payload.

12. The method of claim 10, wherein the second base station backs off to allow the second instance of the payload to be received, and wherein the back-off is configured for at least one of:
    reducing transmission power by the second base station, or
    avoiding transmissions by the second base station on one or more subframes used by the first base station to transmit the second instance of the payload.

13. The method of claim 1, wherein one of the one or more broadcast channel interference coordination schemes comprises receiving a second instance of the broadcast channel scheduling information using a data channel.

14. The method of claim 13, wherein the data channel is a PDSCH and the second instance of the broadcast channel scheduling information is embedded in the PDSCH at a location, the broadcast channel scheduling information being orthogonally distinct from content being transmitted by the second base station.

15. The method of claim 14, wherein the location for the second instance of the broadcast channel scheduling information is negotiated between the first and second base stations.

16. The method of claim 13, wherein the second instance of the broadcast channel scheduling information is embedded in a Multi-Media Broadcast over a Single Frequency Network (MBSFN) subframe for the first base station.

17. The method of claim 16, wherein the MBSFN subframe for the first base station is aligned with a MBSFN subframe for the second base station.

18. The method of claim 1, wherein the receiving further comprises receiving the payload associated with the first base station during a first subframe, wherein a payload associated with the second base station is received from the second base station during the first subframe, and wherein the payload associated with first base station and the payload associated with the second base station are allocated to separate frequency resources.

19. The method of claim 18, wherein the separate frequency resources are statically allocated.

20. The method of claim 18, wherein the separate frequency resources are negotiated between the first base station and second base station over a back-haul network connection.

21. The method of claim 1, wherein the payload comprises either a system information block type 1 (SIB1) or a paging message.

22. The method of claim 1, wherein a received power from the first base station is less than a received power from the second base station.

23. The method of claim 1, wherein the first base station is a pico cell and the second base station is a macro cell.

24. The method of claim 1, wherein the first base station is a macro cell and the second base station is a femto cell.

25. An apparatus for wireless communication, comprising:
means for determining broadcast channel scheduling information for one or more broadcasts of a payload by a broadcast channel associated with a first base station based on one or more broadcast channel interference coordination schemes, wherein reception of the broadcast channel associated with the first base station is interfered at least in part based on one or more transmissions from a second base station; and
means for receiving the payload based on the determined broadcast channel scheduling information,
wherein one of the one or more broadcast channel interference coordination schemes comprises receiving the broadcast channel scheduling information in a broadcast by the second base station, wherein the broadcast from the second base station includes broadcast information associated with the second base station and the broadcast channel scheduling information associated with the first base station, the broadcast channel scheduling information associated with the first base station includes a cross subframe scheduling identifier.

26. A non-transitory computer-readable medium comprising code for:
determining broadcast channel scheduling information for one or more broadcasts of a payload by a broadcast channel associated with a first base station based on one or more broadcast channel interference coordination schemes, wherein reception of the broadcast channel associated with the first base station is interfered at least in part based on one or more transmissions from a second base station; and
receiving the payload based on the determined broadcast channel scheduling information,
wherein one of the one or more broadcast channel interference coordination schemes comprises receiving the broadcast channel scheduling information in a broadcast by the second base station, wherein the broadcast from the second base station includes broadcast information associated with the second base station and the broadcast channel scheduling information associated with the first base station, the broadcast channel scheduling information associated with the first base station includes a cross subframe scheduling identifier.

27. An apparatus for wireless communication, comprising:
a processing system configured to:
determine broadcast channel scheduling information for one or more broadcasts of a payload by a broadcast channel associated with a first base station based on one or more broadcast channel interference coordination schemes, wherein reception of the broadcast channel associated with the first base station is interfered at least in part based on one or more transmissions from a second base station;
receive the payload based on the determined broadcast channel scheduling information; and
receive the broadcast channel scheduling information in a broadcast by the second base station, wherein the broadcast from the second base station includes broadcast information for the second base station and the broadcast channel scheduling information associated with the first base station, the broadcast channel scheduling information associated with the first base station includes a cross subframe scheduling identifier.

28. The apparatus of claim 27, wherein the second base station obtains the broadcast channel scheduling information from the first base station over a back-haul network connection.

29. The apparatus of claim 27, wherein the processing system is further configured to:
receive the broadcast channel scheduling information for the payload in a first subframe; and
receive the payload in a second subframe using the broadcast channel scheduling information received in the first subframe.

30. The apparatus of claim 29, wherein the first subframe occurs before the second subframe, wherein the first subframe is a protected subframe for the first base station, and wherein a user equipment (UE) experiences interference lower than a threshold value from the second base station during the protected subframe.

31. The apparatus of claim 30, wherein the first subframe occurs within a defined window of subframes before the second subframe, and wherein the defined window comprises at least one protected subframe.

32. The apparatus of claim 27, wherein the processing system is further configured to:
receive a first instance of the broadcast channel scheduling information in a first subframe;
receive a second instance of the broadcast scheduling information in a second subframe;
determine that the first instance and the second instance of the broadcast scheduling information are different; and
obtain a third instance of the broadcast channel scheduling information, wherein the third instance is obtained by at least one of:
selecting either the first instance of the broadcast channel scheduling information or the second instance of the broadcast and ignoring the non-selected instance;
applying a likelihood metric to both the first instance and the second instance of the broadcast scheduling information to determine the more likely instance; or
soft-combining the first instance and the second instance of the broadcast scheduling information to generate the third instance.

33. The apparatus of claim 27, wherein the payload associated with the first base station is received based on default broadcast scheduling information, wherein the default broadcast scheduling information is hard coded into a UE.

34. The apparatus of claim 33, wherein the default broadcast scheduling information depends on at least one of a power class or cell identity of the first base station.

35. The apparatus of claim 27, wherein the processing system is further configured to:
receive a second payload, wherein the second payload is transmitted in a first subframe, wherein the first subframe is a protected subframe for the first base station, and wherein the second payload comprises at least one of: a SIB2, SIB3, SIB4 or SIB5.

36. The apparatus of claim 27, wherein the processing system is further configured to:
receive a second instance of the payload in a first subframe, wherein the first subframe is not a protected subframe for the first base station.

37. The apparatus of claim 36, wherein the second base station backs off to allow the second instance of the payload to be received, and wherein the back-off is configured for one or more subframes used by the first base station to broadcast the second instance of the payload.

38. The apparatus of claim 36, wherein the second base station backs off to allow the second instance of the payload to be received, and wherein the processing system is further configured for at least one of:
reducing transmission power by the second base station, or
avoiding transmissions by the second base station on one or more subframes used by the first base station to transmit the second instance of the payload.

39. The apparatus of claim 27, wherein one of the one or more broadcast channel interference coordination schemes comprises receiving a second instance of the broadcast channel scheduling information using a data channel.

40. The apparatus of claim 39, wherein the data channel is a PDSCH, and the second instance of the broadcast channel scheduling information is embedded in the PDSCH at a location, the broadcast channel scheduling information being orthogonally distinct from content being transmitted by the second base station.

41. The apparatus of claim 40, wherein the location for the second instance of the broadcast channel scheduling information is negotiated between the first and second base stations.

42. The apparatus of claim 39, wherein the second instance of the broadcast channel scheduling information is embedded in a Multi-Media Broadcast over a Single Frequency Network (MBSFN) subframe for the first base station.

43. The apparatus of claim 42, wherein the MBSFN subframe for the first base station is aligned with a MBSFN subframe for the second base station.

44. The apparatus of claim 27, wherein the processing system is further configured to receive the payload associated with the first base station during a first subframe, wherein a payload associated with the second base station is received from the second base station during the first subframe, and wherein the payload associated with first base station and the payload associated with the second base station are allocated to separate frequency resources.

45. The apparatus of claim 44, wherein the separate frequency resources are allocated either statically, or negotiated between the first base station and second base station over a back-haul network connection.

46. The apparatus of claim 44, wherein the separate frequency resources are negotiated between the first base station and second base station over a back-haul network connection.

47. The apparatus of claim 27, wherein the payload comprises either a system information block type 1 (SIB1) or a paging message.

48. The apparatus of claim 27, wherein a received power for the first base station is less than a received power for the second base station.

49. The apparatus of claim 27, wherein the first base station is a pico cell and the second base station is a macro cell.

50. The apparatus of claim 27, wherein the first base station is a macro cell and the second base station is a femto cell.

51. A method of wireless communications for a first base station, comprising:
transmitting, by the first base station, broadcast channel scheduling information for a payload associated with the first base station based on one or more broadcast channel interference coordination schemes, wherein interference from a second base station interferes with reception of the broadcast channel scheduling information broadcast by the first base station; and
transmitting the payload based on the one or more broadcast channel interference schemes,
wherein one of the one or more broadcast channel interference coordination schemes comprises transmitting the broadcast channel scheduling information to the second base station over a back-haul connection, wherein a broadcast from the second base station includes broadcast information for the second base station and the broadcast channel scheduling information associated with the first base station, the broadcast channel scheduling information associated with the first base station including a cross subframe scheduling identifier.

52. The method of claim 51, wherein one of the one or more broadcast channel interference coordination schemes comprises:
transmitting the broadcast channel scheduling information for the payload in a first subframe; and
transmitting the payload in a second subframe based on the broadcast channel scheduling information transmitted in the first subframe.

53. The method of claim 52, wherein the first subframe occurs before the second subframe, and wherein the first subframe is a protected subframe for the first base station.

54. The method of claim 53, wherein the first subframe occurs within a defined window of subframes before the second subframe, and wherein the defined window comprises at least one protected subframe.

55. The method of claim 51, wherein the payload associated with the first base station is broadcast based on default broadcast scheduling information, wherein the default broadcast scheduling information is hard coded into a UE.

56. The method of claim 55, wherein the default scheduling information depends on at least one of a power class or cell identity for the first base station.

57. The method of claim 51, further comprising:
transmitting a second payload, wherein the second payload is transmitted in a first subframe, wherein the first subframe is a protected subframe for the first base station, and wherein the second payload comprises at least one of: a SIB2, SIB3, SIB4 or SIB5.

58. The method of claim 51, wherein one of the one or more broadcast channel interference coordination schemes comprises:
transmitting a second instance of the payload in a first subframe, wherein the first subframe is not a protected subframe for the first base station.

59. The method of claim 58, wherein the second base station backs off to allow the second instance of the payload to be received, and wherein the back-off is configured for one or more subframes used by the first base station to broadcast the second instance of the payload.

60. The method of claim 58, wherein the second base station backs off to allow the second instance of the payload to be received, and wherein the back-off configuration further comprises transmitting a request to the second base station to either:
reduce transmission power during the first subframe; or
avoid transmissions during the first subframe.

61. The method of claim 51, wherein one of the one or more broadcast channel interference coordination schemes comprises transmitting a second instance of the broadcast channel scheduling information using a data channel.

62. The method of claim 61, wherein the data channel is a PDSCH and the second instance of the broadcast channel scheduling information is embedded in the PDSCH in a location, the broadcast channel scheduling information being orthogonally distinct from content being transmitted by the second base station.

63. The method of claim 62, further comprising negotiating the location for the second instance of the broadcast channel scheduling information with the second base station.

64. The method of claim 61, wherein the second instance of the broadcast channel scheduling information is embedded in a MBSFN subframe for the first base station.

65. The method of claim 64, wherein the MBSFN subframe for the first base station is aligned with a MBSFN subframe for the second base station.

66. The method of claim 51, wherein the transmitting further comprises transmitting the payload associated with first base station during a first subframe, wherein a payload associated with the second base station is transmitted by the second base station during the first subframe, and wherein the payload associated with first base station and the payload associated with the second base station are allocated to separate frequency resources.

67. The method of claim 66, wherein the separate frequency resources are allocated either statically, or negotiated between the first base station and second base station over a back-haul network connection.

68. The method of claim 51, wherein the payload comprises either a system information block type 1 (SIB1) or a paging message.

69. The method of claim 51, wherein the first base station is a pico cell and the second base station is a macro cell.

70. The method of claim 51, wherein the first base station is a macro cell and the second base station is a femto cell.

71. An apparatus for wireless communication, comprising:
means for transmitting, by a first base station, broadcast channel scheduling information for a payload associated with the first base station based on one or more broadcast channel interference coordination schemes, wherein interference from a second base station interferes with reception of the broadcast channel scheduling information broadcast by the first base station; and
means for transmitting the payload based on the one or more broadcast channel interference schemes,
wherein one of the one or more broadcast channel interference coordination schemes comprises transmitting the broadcast channel scheduling information to the second base station over a back-haul connection, wherein a broadcast from the second base station includes broadcast information for the second base station and the broadcast channel scheduling information associated with the first base station, the broadcast channel scheduling information associated with the first base station including a cross subframe scheduling identifier.

72. A non-transitory computer-readable medium comprising code for:
transmitting, by a first base station, broadcast channel scheduling information for a payload associated with the first base station based on one or more broadcast channel interference coordination schemes, wherein interference from a second base station interferes with reception of the broadcast channel scheduling information broadcast by the first base station; and
transmitting the payload based on the one or more broadcast channel interference schemes,
wherein one of the one or more broadcast channel interference coordination schemes comprises transmitting the broadcast channel scheduling information to the second base station over a back-haul connection, wherein a broadcast from the second base station includes broadcast information for the second base station and the broadcast channel scheduling information associated with the first base station, the broadcast channel scheduling information associated with the first base station including a cross subframe scheduling identifier.

73. An apparatus for wireless communication, comprising:
a processing system configured to:
transmit, by a first base station, broadcast channel scheduling information for a payload associated with the first base station based on one or more broadcast channel interference coordination schemes, wherein interference from a second base station interferes with reception of the broadcast channel scheduling information broadcast by the first base station;
transmit the payload based on the one or more broadcast channel interference schemes; and
transmit the broadcast channel scheduling information to the second base station over a back-haul connection, wherein a broadcast from the second base station includes broadcast information for the second base station and the broadcast channel scheduling information associated with the first base station, the broadcast channel scheduling information associated with the first base station including a cross subframe scheduling identifier.

74. The apparatus of claim 73, wherein the processing system is further configured to:
transmit the broadcast channel scheduling information for the payload in a first subframe; and
transmit the payload in a second subframe based on the broadcast channel scheduling information transmitted in the first subframe.

75. The apparatus of claim 74, wherein the first subframe occurs before the second subframe, and wherein the first subframe is a protected subframe for the first base station.

76. The apparatus of claim 75, wherein the first subframe occurs within a defined window of subframes before the second subframe, and wherein the defined window comprises at least one protected subframe.

77. The apparatus of claim 73, wherein the payload associated with the first base station is broadcast based on default scheduling information, wherein the default broadcast scheduling information is hard coded into a UE.

78. The apparatus of claim 77, wherein the default scheduling information depends on at least one of a power class or cell identity for the first base station.

79. The apparatus of claim 73, wherein the processing system is further configured to:
transmit a second payload, wherein the second payload is transmitted in a first subframe, wherein the first subframe is a protected subframe for the first base station, and wherein the second payload comprises at least one of: a SIB2, SIB3, SIB4 or SIB5.

80. The apparatus of claim 73, wherein the processing system is further configured to:

transmit a second instance of the payload in a first subframe, wherein the first subframe is not a protected subframe for the first base station.

81. The apparatus of claim 80, wherein the second base station backs off to allow the second instance of the payload to be received, and wherein the back-off is configured for one or more subframes used by the first base station to broadcast the second instance of the payload.

82. The apparatus of claim 80, wherein the second base station backs off to allow the second instance of the payload to be received, and wherein the processing system is further configured to:
reduce transmission power during the first subframe; or
avoid transmissions during the first subframe.

83. The apparatus of claim 73, wherein the processing system is further configured to transmit a second instance of the broadcast channel scheduling information using a data channel.

84. The apparatus of claim 83, wherein the data channel is a PDSCH, and the second instance of the broadcast channel scheduling information is embedded in the PDSCH in a location, the broadcast channel scheduling information being orthogonally distinct from content being transmitted by the second base station.

85. The apparatus of claim 84, wherein the processing system is further configured to negotiate the location for the second instance of the broadcast channel scheduling information with the second base station.

86. The apparatus of claim 83, wherein the second instance of the broadcast channel scheduling information is embedded in a MBSFN subframe for the first base station.

87. The apparatus of claim 86, wherein the MBSFN subframe for the first base station is aligned with a MBSFN subframe for the second base station.

88. The apparatus of claim 73, wherein the processing system is further configured to transmit the payload associated with first base station during a first subframe, wherein a payload associated with the second base station is transmitted by the second base station during the first subframe, and wherein the payload associated with first base station and the payload associated with the second base station are allocated to separate frequency resources.

89. The apparatus of claim 88, wherein the separate frequency resources are allocated either statically, or negotiated between the first base station and second base station over a back-haul network connection.

90. The apparatus of claim 73, wherein the payload comprises either a system information block type 1 (SIB1) or a paging message.

91. The apparatus of claim 73, wherein the first base station is a pico cell and the second base station is a macro cell.

92. The apparatus of claim 73, wherein the first base station is a macro cell and the second base station is a femto cell.

* * * * *